(12) United States Patent
Lombardo

(10) Patent No.: US 12,264,091 B1
(45) Date of Patent: Apr. 1, 2025

(54) WASTEWATER TREATMENT SYSTEM

(71) Applicant: HOLM ENVIRONMENTAL ENERGY RESOURCES LLC, Cannonville, UT (US)

(72) Inventor: Pio S. Lombardo, Newton, MA (US)

(73) Assignee: HOLM ENVIRONMENTAL ENERGY RESOURCES LLC, Cannonville, UT (US)

( * ) Notice: Subject to any disclaimer, the term of this patent is extended or adjusted under 35 U.S.C. 154(b) by 523 days.

(21) Appl. No.: 17/732,215

(22) Filed: Apr. 28, 2022

Related U.S. Application Data

(60) Provisional application No. 63/300,309, filed on Jan. 18, 2022.

(51) Int. Cl.
| | | |
|---|---|---|
| *C02F 3/28* | (2023.01) | |
| *C02F 1/66* | (2023.01) | |
| *C02F 101/16* | (2006.01) | |
| *C02F 103/00* | (2006.01) | |

(52) U.S. Cl.
CPC ............. *C02F 3/2826* (2013.01); *C02F 1/66* (2013.01); *C02F 3/286* (2013.01); *C02F 3/288* (2013.01); *C02F 2101/16* (2013.01); *C02F 2103/002* (2013.01); *C02F 2301/046* (2013.01); *C02F 2301/08* (2013.01)

(58) Field of Classification Search
CPC .......... C02F 3/2826; C02F 1/66; C02F 3/286; C02F 3/288; C02F 2101/16; C02F 2103/002; C02F 2301/046; C02F 2301/08
See application file for complete search history.

(56) References Cited

U.S. PATENT DOCUMENTS 5,288,407 A * 2/1994 Bodwell ............... C02F 3/2806
 210/903
5,318,699 A    6/1994 Robertson et al.
5,534,147 A * 7/1996 Kallenbach ............... C02F 3/10
 210/903

(Continued)

OTHER PUBLICATIONS

Environmental Protection Agency, Guidance for Federal Land Management in the Chesapeake Bay Watershed, May 12, 2010, https://www.epa.gov/nps/guidance-federal-land-management-chesapeake-bay-watershed.

(Continued)

*Primary Examiner* — Terry K Cecil
(74) *Attorney, Agent, or Firm* — Workman Nydegger

(57) ABSTRACT

Water treatment systems for year round consistent achievement of less than 2.5 mg/L of total nitrogen from a gray water starting effluent having about 65 mg/L of total nitrogen. The system may include a septic tank, an anaerobic upflow filter (AUF) that receives wastewater from the septic tank, a recirculating media filter (RMF) that receives wastewater from the AUF, and an anoxic denitrification filter that receives wastewater from the RMF. A drain field may be positioned downstream from the denitrification filter for ultimate disposal of the wastewater. The AUF may reduce the biological oxygen demand (BOD), although its presence also aids the combination of the RMF and denitrification filter that follow to consistently achieve <2.5 mg/L of total nitrogen in the system effluent. An equalization tank, recirculation tank, one or more recycle loops, and various pump stations may also be included. The system may be configured as a two-stage system.

19 Claims, 3 Drawing Sheets

(56) References Cited

U.S. PATENT DOCUMENTS

| | | | |
|---|---|---|---|
| 6,531,062 B1 * | 3/2003 | Whitehill | C02F 3/288 |
| | | | 210/903 |
| 2018/0155225 A1 * | 6/2018 | Smith | C02F 3/302 |

OTHER PUBLICATIONS

Nitrogen Removal Wastewater Treatment System, Apr. 2, 2020, http://www.lombardoassociates.com/nitrex.php, Apr. 2, 2020.

* cited by examiner

WASTEWATER TREATMENT SYSTEM

CROSS-REFERENCE TO RELATED APPLICATIONS

The present application claims the benefit of U.S. Provisional Application No. 63/300,309 filed Jan. 18, 2022, which is herein incorporated by reference in its entirety. Each of U.S. Patent Application Nos. 63/012,716 and 63/019,095, filed Apr. 21, 2020 and May 1, 2020, respectively, are herein incorporated by reference in their entirety.

BACKGROUND

One particular difficulty in wastewater treatment is the cost effective reduction of nitrogen compounds (e.g., particularly ammonia, nitrates, and nitrites) within wastewater, to very low levels. For example, while many regulatory standards only require reduction of total nitrogen in such wastewater to 10 mg/L or less, some regulatory standards are far more stringent, e.g., requiring reduction to less than 2.5 mg/L for new construction. It is very difficult to achieve such in a cost effective manner, particularly on a consistent basis, even more particularly on a large scale (e.g., more than 5,000 gallons per day). Because of the extreme difficulty in consistently achieving such a low level, many potential development projects (e.g., hotels, schools, retail centers, etc.) are not undertaken, as there are very limited, if any practical systems and methods for achieving such low nitrogen effluent levels in the context of relatively large installations (e.g., that would need to process at least 5,000, at least 10,000 or at least 15,000 gallons per day (gpd). In addition, even where a given system may be able to achieve such a low total nitrogen level under ideal circumstances, it is important that the standard be consistently achieved over a variety of circumstances (e.g., both in summer, and in winter, in a moist climate and in a dry climate), or permitting is unlikely to ever be approved.

For example, U.S. Pat. No. 5,318,699 (herein incorporated by reference in its entirety) describes a simple denitrification septic tank system that in some circumstances has achieved results that approach the 2.5 mg/L standard. That said, while such a system may achieve such results under some weather and climate conditions, at least some of the time, in a relatively small installation (e.g., a single family home), the ability of this or any other given technology to achieve the <2.5 mg/L standard can depend on climate, for example temperature conditions encountered throughout the year, the climate's humidity (e.g., moist or dry)), as well as alkalinity and other parameters that may affect the results. For example, rainwater and the resulting water sources (e.g., culinary and other running water delivery through piped water systems) in the western United States is typically of a significantly higher pH than similar water sources in the eastern United States (e.g., east vs. west of the Mississippi). Such differences in alkalinity, as well as temperature, and other conditions can affect the ability of a given system to achieve a desired reduction in total nitrogen. Many of the regions which include a very stringent "less than 2.5 mg/L" total nitrogen standard are located in the western U.S., where water is more scarce, where temperatures are often colder (e.g., colder weather climate), where humidity is lower, and where alkalinity is low. Such factors can complicate any effort to consistently achieve such a low total nitrogen standard.

It would be an advantage in the art to provide a commercially viable wastewater treatment system that could treat such relatively large flow rate volumes of water, while consistently achieving (e.g., every month of the year) total nitrogen levels of less than 2.5 mg/L, that would be suitable for use under conditions as described herein (e.g., cold weather climate), low alkalinity water sources, etc.

SUMMARY

An embodiment of the present invention provides a water treatment system for year round consistent achievement of less than 2.5 mg/L of total nitrogen from a wastewater starting effluent having at least about 30 mg/L, at least 40 mg/L, or at least 50 mg/L (e.g., typically about 65 mg/L, however it may not be unusual to have 150 mg/L in non-residential applications) of total nitrogen. The system may include a septic tank, an anaerobic upflow filter (AUF) that receives wastewater from the septic tank, a recirculating media filter (RMF) that receives wastewater from the AUF, and a Nitrex™ filter (e.g., similar to that described in U.S. Pat. No. 5,318,699) that receives wastewater from the RMF. A drain field disposal system may be positioned downstream from the Nitrex™ filter for ultimate disposal of the wastewater. By way of example, the AUF may principally serve to reduce the biological oxygen demand (BOD) of the wastewater, although its presence also aids the combination of the RMF and Nitrex™ filter that follow to consistently achieve <2.5 mg/L of total nitrogen in the system effluent. Returning to the AUF, for example, where the wastewater input to the AUF may have a BOD of perhaps 180 mg/L, this may be reduced in the AUF effluent by 30-80%, e.g., to 90 mg/L. The BOD can be further reduced in the modules of the system that follow, such as principally in the RMF. The RMF may be configured as an attached growth trickling filter, e.g., including a container (e.g., tank) with media provided therein (e.g., polyurethane foam cubes, textile, plastic media, etc.) through which the wastewater passes. While the AUF may be an "upflow" filter (flow counter to gravity), the RMF may be a downflow filter, with influent entering at the top, and trickling through the media with attached microbe growth, towards the outlet at the bottom. Adequate circulation and ventilation is maintained in the RMF so that the air in contact with the thin film of wastewater coating the media is not depleted of oxygen. Circulation and ventilation can be achieved via an internal circulation fan and passive ventilation openings (e.g., covered with activated carbon filters for odor control, etc.).

Downstream from the RMF a Nitrex™ filter is provided. The Nitrex™ filter refers to an anoxic denitrification filter that includes an excavation (e.g., lined), a wood-based or other organic carbon-based media mixture (e.g., wood chips/shavings, and sand or fine silt, mixed together). The Nitrex™ filter also includes inlet and outlet manifolds for delivery of influent and withdrawal of effluent. Additional structure such as internal piping, control valves, section dividers, etc. may also be present. The Nitrex™ filter is simple, operating on the phenomenon that when organic carbon in the wood or similar material (cellulose, hemicellulose and/or lignin containing) is maintained under anaerobic conditions (e.g., devoid of oxygen), microbes present within the Nitrex™ filter are able to convert ammonia, nitrites, nitrates or other undesirable, polluting forms of nitrogen in the wastewater into nitrogen gas ($N_2$), which is inert and harmless, and can simply be vented to the atmosphere. Such a Nitrex™ filter may be based on the configurations described in U.S. Pat. No. 5,318,699, herein incorporated by reference in its entirety.

The wastewater effluent leaving the Nitrex™ filter has drastically reduced nitrogen content, as well as significantly reduced BOD and total suspended solids (TSS) as compared to the system influent. For example, where the influent entering the system may have BOD of 180 mg/L, TSS of 100 mg/L and total nitrogen (TN) of 65 mg/L, the effluent from the system, which is conveyed to the drain field for ultimate disposal may have a BOD of less than 30 mg/L, TSS of less than 30 mg/L, and TN of less than 2.5 mg/L. Such may be achieved on a consistent basis, day in and day out, year round (every month of the year), no matter the ambient temperature in the environment or climate where the system is installed, rather than as is the case in some previous systems (even those incorporating a Nitrex™ filter), which may have achieved such a standard only periodically, rather than every day of every month of every year.

Another embodiment may be more specifically directed to a water treatment system for consistently achieving less than 2.5 mg/L of total nitrogen from a wastewater starting influent having at least 30, at least 40, at least 45, or at least 50 mg/L (e.g., about 65 to 150 mg/L) of total nitrogen, the system comprising a septic tank, a flow equalization tank that receives wastewater from the septic tank, an anaerobic upflow filter (AUF) that receives wastewater from the flow equalization tank, a recirculation tank that receives wastewater from the anaerobic upflow filter, a recirculating media filter (RMF) that receives wastewater from the recirculation tank, an RMF effluent pump station for recycling a portion of effluent from the RMF to the recirculation tank, at a selected recycle ratio, a Nitrex™ filter fed by the portion of effluent from the RMF that is not recycled back to the recirculation tank, a $2^{nd}$ recirculation tank that receives wastewater from the Nitrex™ filter a $2^{nd}$ RMF that receives wastewater from the $2^{nd}$ recirculation tank, a $2^{nd}$ RMF effluent pump station for recycling a portion of effluent from the $2^{nd}$ RMF to the $2^{nd}$ recirculation tank, an effluent recycle and drain field pump station receiving wastewater from the $2^{nd}$ RMF and a drain field disposal that receives wastewater from the effluent recycle and drain field pump station. Such a system and associated method may be used for start-up of a dual stage system, as described below.

Another embodiment is directed to a water treatment system for consistently achieving less than 2.5 mg/L of total nitrogen from a gray water starting influent having at least 30, at least 40, at least 45, at least 50 mg/L, or from about 40 to about 80 mg/L of total nitrogen, the system comprising a septic tank, a flow equalization tank that receives wastewater from the septic tank, an anaerobic upflow filter (AUF) that receives wastewater from the flow equalization tank, a $1^{st}$ stage recirculation tank that receives wastewater from the anaerobic upflow filter, a $1^{st}$ stage recirculating media filter (RMF) that receives wastewater from the $1^{st}$ stage recirculation tank; a $1^{st}$ stage RMF effluent pump station for recycling a portion of effluent from the $1^{st}$ stage RMF to the $1^{st}$ stage recirculation tank, at a selected recycle ratio, a $1^{st}$ stage Nitrex™ filter fed by the portion of effluent from the $1^{st}$ stage RMF that is not recycled to the $1^{st}$ stage recirculation tank, a $2^{nd}$ stage recirculation tank that receives wastewater from the $1^{st}$ stage Nitrex™ filter, a $2^{nd}$ stage RMF that receives wastewater from the $2^{nd}$ stage recirculation tank, a $2^{nd}$ stage RMF effluent pump station for recycling a portion of effluent from the $2^{nd}$ stage RMF to the $2^{nd}$ stage recirculation tank, a $2^{nd}$ stage Nitrex™ filter fed by the portion of effluent from the $2^{nd}$ stage RMF that is not recycled to the $2^{nd}$ stage recirculation tank, an effluent recycle and drain field pump station that receives wastewater from the $2^{nd}$ stage Nitrex™ filter and a drain field disposal system fed by the effluent recycle and drain field pump station.

Any of such embodiments may include an alkalinity feed system for increasing alkalinity of the wastewater before entrance of the wastewater into the RMF. By way of example, the alkalinity may be adjusted to a value of from 400 to 600 mg/L before entrance into the RMF. Such adjustment can be important to ensuring not only that the BOD is reduced as intended within the RMF, but also in ensuring that the total nitrogen content of the wastewater is reduced as desired For example, alkalinity is consumed in nitrification, which then causes pH to decrease, interfering with nitrification (e.g., at a pH below about 6, nitrification stops).

The system may be particularly adapted to achieve very low nitrogen concentrations, even in cold weather climates, every day of every month, over the course of multiple years. The system is low maintenance. Cold weather climates can be categorized in various ways. For example, a cold weather climate may be one where the daily low temperature reaches below freezing at least one day in that given month, or where the daily low temperature reaches below freezing at least half the days in a given month, etc. Cold weather climate could also be categorized as zone 5 or higher, or zone 6 or higher according to the International Energy Conservation Code (IECC), as designated by the U.S. Department of Energy. More particularly, the cold weather climates where the present systems are particularly adapted to achieve such excellent results may be in such a zone (e.g., 5+), which is also designated "dry" (versus "moist" or "marine") under the IECC. One such exemplary climate is found in Garfield County, Utah. While the systems may be particularly adapted to consistently achieve such excellent results in such climates, they may also be suitable for use, while achieving similar results, in other (e.g., warmer and/or moister) climates, as well.

It will be appreciated that in an embodiment, the wastewater being treated is "total wastewater" as that term is understood within the art, e.g., including wastewater from various sources such as showers, sinks, bathtubs, washing machines, dishwashers, wastewater from toilets, etc.

Further features and advantages of the present invention will become apparent to those of ordinary skill in the art in view of the detailed description of preferred embodiments below.

BRIEF DESCRIPTION OF THE DRAWINGS

A more particular description of the invention briefly described above will be rendered by reference to specific embodiments as illustrated in the appended drawings. Understanding that these drawings depict only typical embodiments of the invention and are therefore not to be considered limiting of its scope, the invention will be described and explained with additional specificity and detail through the use of the accompanying drawings.

DETAILED DESCRIPTION

I. Definitions

Figure 1:
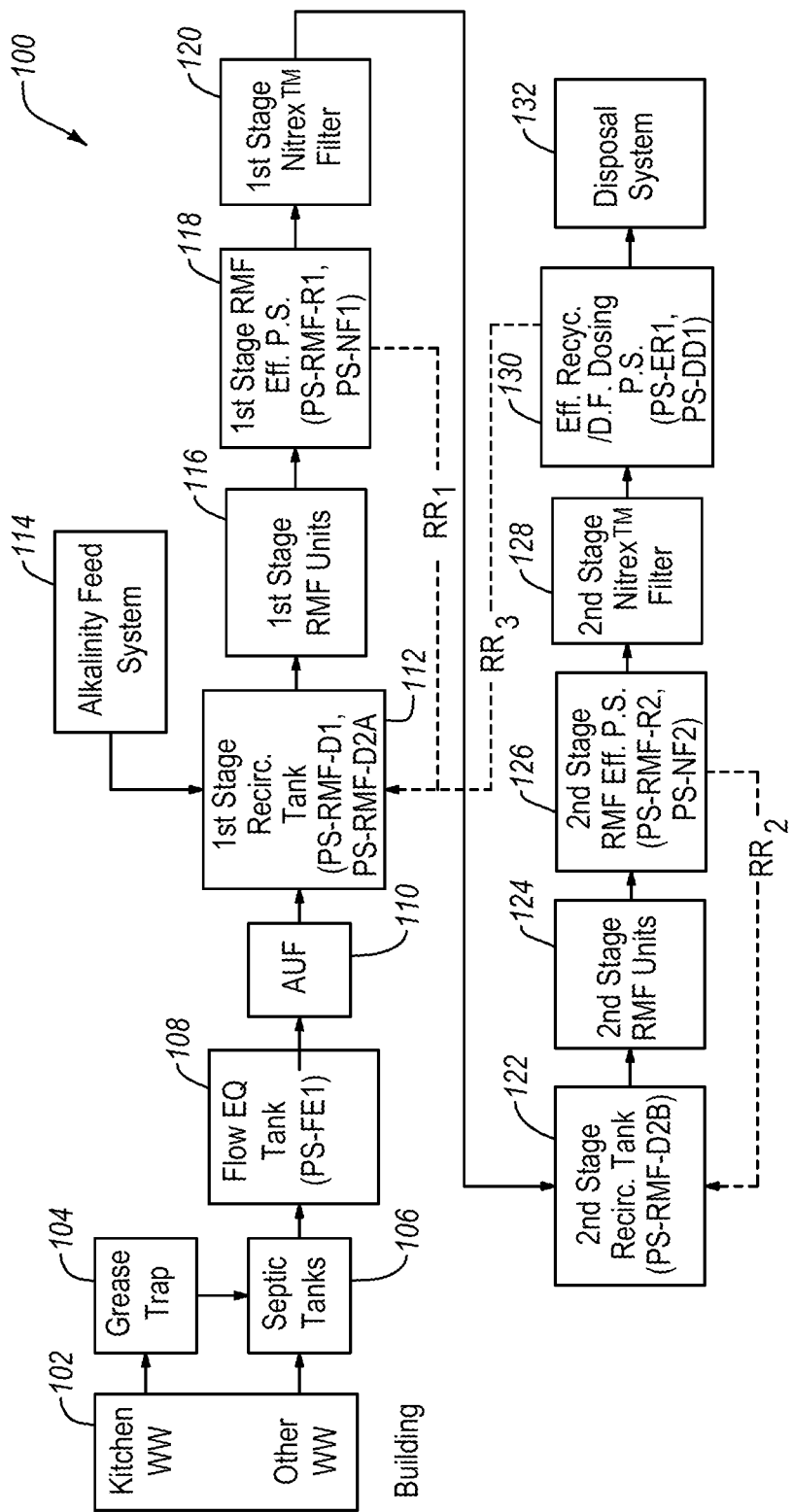
FIG. 1 shows a flow diagram of an exemplary wastewater treatment system.

All publications, patents and patent applications cited herein, whether supra or infra, are hereby incorporated by reference in their entirety to the same extent as if each individual publication, patent or patent application was specifically and individually indicated to be incorporated by reference.

The term "comprising" which is synonymous with "including," "containing," or "characterized by," is inclusive or open-ended and does not exclude additional, unrecited elements or method steps.

The term "consisting essentially of" limits the scope of a claim to the specified materials or steps "and those that do not materially affect the basic and novel characteristic(s)" of the claimed invention.

The term "consisting of" as used herein, excludes any element, step, or ingredient not specified in the claim.

The terms "a," "an," "the" and similar referents used in the context of describing the inventive features (especially in the context of the following claims) are to be construed to cover both the singular and the plural, unless otherwise indicated herein or clearly contradicted by context. Thus, for example, reference to a "tank" can include one, two or more tanks.

Numbers, percentages, ratios, or other values stated herein may include that value, and also other values that are about or approximately the stated value, as would be appreciated by one of ordinary skill in the art. For example, the stated values may include values that are within 25%, 15%, 10%, within 5%, within 1%, etc. of a stated value. By way of example, a stated value should therefore be interpreted broadly enough to encompass values that are at least close enough to the stated value to perform a desired function or achieve a desired result, and/or values that round to the stated value. All such values are therefore considered to be preceded by the term "about". When the terms "about," "approximately," "substantially," or the like are used in conjunction with a stated amount, value, or condition, it may be taken to mean an amount, value or condition that deviates by less than 20%, less than 10%, less than 5%, less than 1%, less than 0.1%, or less than 0.01% of the stated amount, value, or condition. As used herein, the term "between" includes any referenced endpoints. For example, "between 2 and 10" includes both 2 and 10.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

Some ranges are disclosed herein. Additional ranges may be defined between any values disclosed herein as being exemplary of a particular parameter. All such ranges are contemplated and within the scope of the present disclosure. Further, recitation of ranges of values herein is intended to serve as a shorthand method of referring individually to each separate value falling within the range. Unless otherwise indicated herein, each individual value is incorporated into the specification as if it were individually recited herein.

While mention of a value of "<x mg/L" relative to a given component may technically be a range, and may technically include very low values, far lower than the value of x, those of ordinary skill in the art will appreciate that reference to such standards, and to an associated concentration of a given component in wastewater being "<x" typically refers to a scenario where the concentration is less than the value of x, but not by much. For example when referring to a BOD of <30 mg/L in a given stream, the BOD value may typically not be 0-10, or perhaps not even 0-20, but may most likely be in the range of 15-29 or 20-29, as one may typically say that the value was <20 mg/L, if it actually were, rather than simply saying <30 mg/L. Stated another way, the concentration of any such component may typically be present at a value that is at least 50%, or at least 75%, of "x" (e.g., when stating BOD is <30 mg/L, the BOD may therefore typically be present at 15-29 mg/L, or 22.5-29 mg/L). Such factors similarly apply to TSS and TN.

The phrase 'free of' or similar phrases as used herein means that the composition comprises 0% of the stated component, that is, the component has not been intentionally added to the composition. However, it will be appreciated that such components may incidentally form under appropriate circumstances, may be incidentally present within another included component, e.g., as an incidental contaminant, or the like.

The phrase 'substantially free of' or similar phrases as used herein means that the composition preferably comprises 0% of the stated component, although it will be appreciated that very small concentrations may possibly be present, e.g., through incidental formation, incidental contamination, or even by intentional addition. Such components may be present, if at all, in amounts of less than 1%, less than 0.5%, less than 0.1%, less than 0.01%, less than 0.001% (10 ppm), less than 5 ppm, less than 1 ppm, or less than 0.1 ppm.

In reference to various standardized tests or standards (e.g., ASTM or others), it will be understood that reference to any such standard refers to the latest update (if any) of such standard. Even where no such standard may be specifically mentioned, those of skill in the art will appreciate where a suitable standard applies, and reference to such a standard may be implied or inferred.

II. Introduction

The present disclosure is directed to, among other things, methods and systems for treating total wastewater so as to consistently achieve less than 2.5 mg/L of total nitrogen in the treated wastewater. By "consistently", it is meant that the level of nitrogen does not equal or exceed 2.5 mg/L as regularly tested, based on the regulatory testing requirements. For example, testing may be conducted daily, weekly, monthly, or the like, and such standard may be achieved on an ongoing basis, day in and day out, during every month of the year, over a period of multiple years so long as the system is operating properly. While some systems may exist within the field that are able to periodically or intermittently achieve such very low nitrogen levels, they may have difficulty achieving such year round, e.g., particularly in the winter months when ambient temperatures are colder. Such results are not consistent. Results can also be affected by alkalinity levels in the wastewater and climate moisture levels (e.g., dry vs. moist). Similarly, while some systems may be able to achieve such low nitrogen levels where the starting wastewater may have a nitrogen level that is already relatively low (e.g., less than 50, less than 40, less than 35, less than 30, or less than 25 mg/L of nitrogen in the starting wastewater), they are not able to consistently achieve such a <2.5 mg/L threshold when the starting nitrogen loading level is higher (e.g., higher than 40 mg/L, higher than 50 mg/L, such as 65 mg/L, or 50-100 mg/L). In addition, some small scale systems may be capable of achieving such a low threshold at least some of the time, but such systems are only capable of treating small flows of wastewater, e.g., such as would exist in a single family home, or the like.

The present systems are designed to advantageously consistently achieve very low nitrogen levels of less than 2.5 mg/L day in and day out, throughout the year, even in cold weather (e.g., winter operation through the months of November-February in the higher latitudes of the northern hemisphere, where the daily low temperature may be below freezing a majority of days in such month), and for relatively large flows of wastewater, e.g., at least 5,000 gpd, at least 10,000 gpd, or at least 15,000 gpd, or higher.

In an embodiment, the water treatment system includes a septic tank, an anaerobic filter, such as an anaerobic upflow filter (AUF) that receives wastewater from the septic tank, and a recirculating media filter (RMF) that receives wastewater from the AUF. An anoxic Nitrex™ filter is provided downstream from the RMF, for achieving the final reduction in nitrogen levels, after which the treated wastewater may be disposed of in a drain field or the like.

The AUF may comprise a tank with filter media positioned therein, on which beneficial bacteria naturally grow. Under the anaerobic conditions associated with the AUF, followed by treatment in the RMF (which operates under aerobic conditions, where airflow (and oxygen) is actively provided to the system), the biological oxygen demand (BOD) of the wastewater is first reduced. Total suspended solids (TSS) may also be reduced due to treatment in the sequence of the RMF, as well as settling that may occur within one or more provided flow equalization tanks, and/or the septic tank itself at the start of the system. Although some reduction in total nitrogen may occur within the RMF, the predominant reduction in nitrogen levels occurs subsequently, in the anoxic Nitrex™ filter, which treatment is provided after treatment of the wastewater in the AUF and RMF. By way of example, the effluent from the AUF and into the RMF may include BOD of <90 mg/L (e.g. 60-89), and TSS of 50 mg/L. Effluent from the RMF, and/or into the Nitrex™ filter may include BOD of <30 mg/L, TSS of <30 mg/L, and TN of <25 mg/L (e.g., 20-24 mg/L).

The Nitrex™ filter can be simple in design and operation, e.g., simply including an excavation (e.g., excavation lined with an impermeable membrane material such as polyethylene or the like) filled with an organic carbon-based media (e.g., wood chips, shavings, sawdust or the like) and potentially mixed with an inorganic material such as sand or fine silt), with an inlet manifold for distributing the wastewater to the wood-based or other organic carbon media mixture where denitrification occurs. An outlet manifold may also be provided, e.g., for collecting the wastewater treated in the media of the Nitrex™ filter, for ultimate disposal. The inlet manifold may be disposed at a upper end of the excavation (e.g., above the media mixture), while the outlet manifold may be at the lower portion thereof (e.g., below the media mixture) By way of example, the excavation filled with the media mixture may be divided into a plurality of dosing sections which may be hydraulically separated from one another (e.g., separated by an impermeable membrane, concrete divider or the like), where the inlet manifold delivers the wastewater influent coming into the Nitrex™ filter to a given dosing section until the capacity of that particular section has been reached, after which the next, adjacent dosing section is then dosed, until its capacity has been reached, and so on. Once all such sections have been dosed to their desired capacity, dosing starts with the first dosing section again, repeatedly continuing on through the various sections.

As will be described herein, a contemplated embodiment of the treatment system may include first and second stages (e.g., with an RMF and Nitrex™ filter provided in each stage of the system, and the AUF shared by both stages, before the $1^{st}$ stage is entered). Where such is the case, the $2^{nd}$ stage Nitrex™ filter may simply be a designated section of the same overall Nitrex™ filter excavated installation that includes the $1^{st}$ stage Nitrex™ filter. For example, an overall large Nitrex™ filter may be provided, with 4 sections, where sections 1-3 make up the $1^{st}$ stage Nitrex™ filter, and the $4^{th}$ section makes up the $2^{nd}$ stage Nitrex™ filter. An example of such an embodiment will be described in further detail hereafter, in conjunction with FIGS. 1 and 2.

In addition to the AUF, the RMF, and the Nitrex™ filter, various flow equalization and other tanks may be provided between such modules of the system, as well as various pump stations provided between various system modules. In at least some cases, the pumps of such pump stations may be disposed within an associated tank of the system, reducing overall system noise, etc. The system may also incorporate one or more recycle loops, where a portion of the flow from a given module may be recycled back to an earlier module within the system, as will be explained in further detail hereafter.

The combination of the AUF, RMF, and Nitrex™ filter(s) advantageously allows consistent achievement of a very low threshold of total nitrogen within wastewater effluent exiting the overall system, meeting applicable (relatively new) very stringent standards for denitrification in wastewater for some types of new construction. While many standards allow for a denitrification standard of less than 10 mg/L, at least some states and regulatory entities, particularly in the western United States, where the climate is arid and water is relatively scarce, are now requiring a denitrification standard of less than 2.5 mg/L for many types of new commercial construction. Such a standard can be consistently met using the systems and methods described herein, in an economical manner, month in and month out, irrespective of the particular season and climate conditions (e.g., whether in summer or winter, whether in a "dry" climate or "moist" climate, etc). Such is an advantage of the present invention.

III. Exemplary Systems and Methods

FIG. 1 shows an exemplary water treatment system and method 100 according to an embodiment of the present invention, which is capable of achieving the very low <2.5 mg/L total nitrogen threshold on a consistent basis, as described herein. As shown in FIG. 1, system 100 may be configured to treat total wastewater generated from typical total wastewater sources (e.g., sinks, bathtubs, showers, toilets, etc., as shown at 102. A grease trap 104 (particularly for kitchen generated wastewater) and septic tank(s) 106 may be provided, as the initial modules of the treatment system 100. The grease trap may be sized appropriately, depending on the particular flow requirements of the overall system. By way of example, for a hotel generating a design flow of about 16,000 gpd of wastewater, without a formal kitchen (e.g., serving continental breakfast only), the grease trap may be sized at 1,000 gallons. The provided septic tank may similarly be sized appropriately depending on the particular characteristics of the generated wastewater and its volume. In the above example, with a design flow of 16,000 gpd, the provided septic tanks may be sized at 1.5 times the daily design flow, which would be 24,000 gallons in the above example. The septic tank may be provided as a plurality of single compartment tanks, in series or parallel (e.g., 2 or 3 tanks, each sized equally). By way of example, 38,000 gallon tanks may be used in the above example. While series or parallel configurations for multiple tanks of a given module (e.g., septic tank, recirculation tank, etc.) may be described, in an embodiment, a series arrangement is considered advantageous. In addition, although the design flow may be a given number (e.g., 16,000 gpd), actual average flow may typically be less, e.g., such as 50-75% of the design flow (i.e., 8,000-12,000 gpd).

A flow equalization tank 108 is provided, for evening out flow to the downstream modules of the system. For example, wastewater generation may be greatest during certain hours of the day (e.g., in the morning hours when hotel guests are showering, etc.), or at other times of day, depending on the particular activities responsible for generation of the wastewater. Including a flow equalization tank 108 advantageously allows flow amounts through the system treatment modules to be substantially equalized, at more or less a constant flow rate, throughout the day, or even to equalize flow across multiple days, where occupancy may be higher, etc. For example, in a system that might have a design flow of 16,000 gpd of wastewater, this would equate to a constant treatment flow rate of 667.67 gph. The flow equalization tank may be fed (e.g., by gravity flow) from the final tank provided as septic tank(s) 106.

The size of the flow equalization tank may similarly be sized based on the flow characteristics of the generated wastewater. By way of example, where the design flow is 16,000 gpd, the actual average daily flow may be significantly less than this, such as 50-75% of the design flow (e.g., 8,000 to 12,000 gpd). The equalization tank may be sized to provide a hydraulic retention time of 1 day or less, such as 0.5 to 1 day (e.g., 0.75 day). The equalization tank may also be provided with dead storage volume (that volume within the tank which is below the level where the pump may be mounted therein, for withdrawing its contents). By way of example, the dead storage volume may be about 10-20% of the desired working volume. By way of further example, where the desired working volume may be 12,000 gallons, a dead storage volume of 2,000 gallons may be provided, so that the equalization tank may have an overall volume of 14,000 to 16,000 gallons.

It will be apparent that actual tank sizes will of course vary depending on the daily flow volume of wastewater being treated. That said, the tank volume may be selected to ensure that the hydraulic residence time is from 0.25 to 1.25 days, or from 0.5 to 1 day, and that the dead storage volume may be at least 5%, at least 10%, such as 5-20%, or 10-20% of total tank volume.

In addition to storing wastewater during periods where wastewater generation is in excess of the average daily flow (peak flow times), and dosing stored flow during off-peak times, the flow equalization tank is also advantageous where the treatment system may need to be taken offline for a brief period of time to perform maintenance or repairs. Multiple tanks may be used to provide the desired equalization tank volume, e.g., provided in series or parallel. By way of example, 28,000 gallon tanks could be used to provide an equalization tank volume of 16,000 gallons.

The dead storage volume may be provided below the operating water level in the tank. For example, submersible centrifugal pumps with a bottom suction inlet may be used in the tank to withdraw wastewater from the equalization tank(s). Such pumps may be used in any of the tanks described herein. If the floats were set with a minimum operating level of 1 ft above the bottom of the tank (e.g., an 8,000 gallon tank), this may provide 1,000 gallons of dead storage volume within each of such tanks (e.g., 2,000 gallons of dead storage volume total for 28,000 gallon tanks). The dead storage volume provides additional settling volume after the septic tank 106, and helps guard against splashing or odor generation, particularly when a submerged inlet pipe is also provided. Additional details relative to an exemplary equalization tank and a pump station housed therein are found in the provisional applications, already incorporated by reference.

The flow equalization tank 108 may not provide any significant reduction in BOD or TN of the wastewater (although it may settle out some solids, reducing TSS), and may be followed by the anaerobic filter 110, which may be a first treatment module in the system 100 configured actually begin treating BOD or nitrogen levels of the wastewater (other than the septic tank, which is $1^{st}$). While an anaerobic upflow filter (AUF) is shown and particularly described, it will be appreciated that in some embodiments, other types of anaerobic filters (e.g., an anaerobic downflow filter) or no anaerobic filter at all may also be suitable for use. The AUF is designed to provide BOD removal prior to introduction of the wastewater into the RMF unit(s). The AUF may provide a residence time that is shorter than that of the equalization tank (e.g., from 4 to 10, or from 4-8 hours). The AUF may comprise one or more tanks of desired volume, packed with media configured to reduce the BOD of the wastewater flowing therethrough. The BOD removal achieved in the AUF may only be partial, in the sense that significant additional BOD removal may occur downstream, in other treatment modules of the system. By way of example, the BOD removal achieved in the AUF may be from 30-80%, 30-70%, or from 40-60% (e.g., 50%) relative to the BOD of the starting influent. By way of example, where the starting wastewater has a BOD of 180 mg/L, the effluent wastewater from the AUF may have a BOD of only 90 mg/L (i.e., a 50% reduction).

The AUF media can be stones, plastic, wood chips, etc. The key consideration, as will be appreciated by those of skill in the art, is providing appropriate media surface area on which bacteria grow.

Effluent from the AUF is sent to the $1^{st}$ stage recirculation tank 112. The recirculation tank 112 serves to blend recycled RMF treated wastewater (from RMF 116 through pump station 118) with wastewater coming through from the septic tank, flow equalization tank and AUF (106, 108, 110 respectively). The purpose of such a recirculation tank is to dilute the strength of the influent wastewater and to provide for partial denitrification. Denitrification typically regenerates some of the alkalinity consumed by nitrification. Recirculation tank 112 also provides additional storage volume above the normal operating water level for periods of high flows. By way of example, the $1^{st}$ stage recirculation tank may be designed to exhibit a hydraulic residence time similar to that of the equalization tank 108 (e.g., 0.5 to 1 day, such as 0.75 day). For a system design flow of 16,000 gpd, and an expected typical operational flow of 12,000 gpd, the recirculation tank 112 may be sized with a volume of 16,000 gallons. Such a volume may be provided by two or more smaller tanks (e.g., 28,000 gallon tanks) configured in series (or parallel) to make up the total desired recirculation volume. As shown in FIG. 1, a $2^{nd}$ stage recirculation tank 122 may similarly be provided, which can be fed by effluent from the $1^{st}$ stage Nitrex™ filter 120, blended with recycled effluent from the $2^{nd}$ stage RMF 124 (through pump station 126), which $2^{nd}$ stage modules are intended to "polish" the wastewater quality by further reducing one or more of BOD, TSS, or TN (e.g., particularly TN). $2^{nd}$ stage recirculation tank 122 may be designed to provide reduced hydraulic residence time values as compared to the $1^{st}$ stage recirculation tank 112. For example, the hydraulic residence time of the $2^{nd}$ stage recirculation tank 122 may be from 0.25 to 0.75 day, such as 0.25 to 0.5 day. By way of further example, for a design flow of 16,000 gpd (with a typical expected operational flow of 12,000 gpd), the $2^{nd}$ stage recirculation tank may be sized at 8,000 gallons.

The effluent from the $1^{st}$ stage recirculation tank 112 is fed into the $1^{st}$ stage RMF 116. The RMF module is advantageously positioned between the AUF (which precedes the RMF) and the Nitrex™ filter (which follows the RMF). As shown in FIG. 1, the total RMF treatment can be split between $1^{st}$ and $2^{nd}$ stage RMF units (RMF units 116 and 124). The $1^{st}$ stage RMF 116 may be sized so as to be capable of treating 100% of the design flow (e.g., 16,000 gallons in the example described herein). The $2^{nd}$ stage RMF may be used for "polishing", and as a redundant treatment unit, and may be sized smaller than the $1^{st}$ stage RMF unit. For example, the $2^{nd}$ stage RMF may be 25-50% (e.g., 30-40%, such as ⅓) the capacity of the $1^{st}$ stage RMF 116.

The RMF units can be configured as tanks loaded with appropriate media (e.g., polyurethane or other foam, textile, plastic, etc.) in any suitable shape, such as foam cubes, cylinders, rectangular prisms, spheres, ovoids, or any other suitable shape. In an embodiment, 3 inch foam cubes may be used. The RMF units may be characterized as attached growth trickling filters, e.g., for treatment of wastewater at organic loading rate of from 0.01-0.025 lb/day/ft$^3$. They may be characterized by downward flow. The treatment rate noted (e.g., particularly values from 0.02 to 0.025 lb/day/ft$^3$) is relatively high, but can be achieved with adequate circulation and ventilation so that the air in contact with the thin film of wastewater coating the media is not depleted of oxygen. Circulation and ventilation can be achieved via any suitable means, such as an internal circulation fan (active ventilation) and one or more passive ventilation openings. Table 1 below presents an exemplary oxygen demand calculation and the resulting volume of media required to facilitate sufficient oxygen transfer to meet the demand.

TABLE 1

| Oxygen Demand and RMF Media Volume | | |
|---|---|---|
|  | All Units in Service | 1 Unit Offline |
| AUF Effluent BOD (mg/L) | 90 | 90 |
| BOD Oxygen Demand Factor (mg/L O$_2$/mg/L BOD) | 1.8 | 1.8 |
| TKN (mg/L) | 65 | 65 |
| TKN Oxygen Demand Factor (mg/L O$_2$/mg/L BOD) | 4.6 | 4.6 |
| Total Oxygen Demand (mg/L) | 461 | 461 |
| Design WW Flow (gpd) | 16,000 | 16,000 |
| Oxygen Demand Mass (lb/day) | 61.6 | 61.6 |
| RMF Media Oxygen Transfer Design Capacity (lb/day/ft$^3$) | 0.021 | 0.021 |
| Minimum Media Volume | 2,990 | 2,990 |
| Total Media Volume Provided | 4,940 | 3,705 |
| Media Provided/Required | 165% | 124% |

Two stages for the RMF biofilter may be provided in an exemplary embodiment, divided as follows:

$1^{st}$ stage RMF capacity—3 units, 3,705 ft$^3$ media volume total $2^{nd}$ stage RMF capacity—1 unit, 1,235 ft$^3$ media volume Additional details for the sizing of the $1^{st}$ and $2^{nd}$ stage RMF units are shown below, in Table 2.

TABLE 2

| $1^{st}$ Stage RMF Biofilter System Sizing | |
|---|---|
| Total RMF Media Vol. Req'd (ft$^3$) | 4,040 |
| % of Total for $1^{st}$ Stage RMF | 100% |
| Total $1^{st}$ Stage RMF Media Vol. Req'd (ft$^3$) | 2,990 |
| RMF Media Area Proposed (ft$^3$) | 3,705 |
| Total Media % of Required Media | 124% |
| RMF Media Depth (ft) | 7.5 |
| Max Hydraulic Loading Rate (gpd/ft$^3$) | 4.3 |
| $2^{nd}$ Stage RMF Biofilter System Sizing | |
| Total RMF Media Vol. Req'd (ft$^3$) | 1,235 |
| % of Total for $1^{st}$ Stage RMF | 33% |
| Total $2^{nd}$ Stage RMF Media Vol. Req'd (ft$^3$) | 997 |
| RMF Media Area Proposed (ft$^3$) | 1,235 |
| Total Media % of Required Media | 124% |
| RMF Media Depth (ft) | 7.5 |
| Max Hydraulic Loading Rate (gpd/ft$^3$) | 13.0 |

Active air circulation can be achieved via circulation fans within each RMF tank. Passive ventilation can also be provided through one or more (e.g., a plurality) of access openings. Each access opening can be equipped with a large vent opening as described in the example, and an associated carbon filter. Such a carbon filter may aid in controlling odors, etc.

The RMF units provide for initial treatment, e.g., completing nitrification and subsequent partial denitrification of the wastewater, and for "polishing" (particularly the $2^{nd}$ stage RMF). By "nitrification" followed by partial denitrification, it will be understood that some conversion may occur, e.g., from ammonia or ammonium ions to nitrites and/or nitrates (nitrification), within the wastewater, as well as some conversion of such nitrites or nitrates to nitrogen gas (i.e., denitrification), which diatomic gaseous nitrogen can be harmlessly vented to the atmosphere. Both $1^{st}$ and $2^{nd}$ stage RMF units may be dosed by pump stations positioned within the effluent ends of the respective $1^{st}$ and $2^{nd}$ stage recirculation tanks (e.g., PS-RMF-D1 and PS-RMF-D2B in recirculation tanks 112 and 122).

The RMF biofilter unit(s) may reduce total nitrogen levels to below 30, below 20, or below 15 mg/L when treating residential strength wastewater (e.g., starting influent of ~65 mg/L, as described herein), even in cold climate conditions (e.g., where it may freeze on average, at least half of the days in a given month, such as may be the case in many upper northern latitudes from November-February). By way of example, the RMF biofilter may remove at least 90% (e.g., 95%) of BOD (e.g. cBODs), at least 90, or at least 95% (e.g., 98%) of TSS, and at least 50%, or at least 55% (e.g., 55-65%) of TN. In an example, removal of such components from the wastewater in the RMF may be as shown below in Table 3. The values shown in Table 3 are for influent having TN at 65 mg/L.

TABLE 3

| Cold Climate RMF Removal Efficiency | | |
|---|---|---|
|  | RMF Effluent | % Removal |
| cBOD5 | <10 mg/L | 95-96% |
| TSS | <10 mg/L | 97-98% |
| NH$_4$-N | 1-3 mg/L | 97-98% |
| TN | 20-25 mg/L | 59-65% |

Effluent from the RMF units may drain from the bottom of each unit, to a pump station tank. A portion of the effluent from the RMF units may be recycled back ($RR_1$ and $RR_2$) to the respective recirculation tank (112 and 122, respectively), while the remainder of the effluent that is not recycled back may proceed to the corresponding Nitrex™ filter (120 and 128, respectively) for further denitrification.

The $1^{st}$ stage RMF units may be configured as, e.g., 2 or more units in series or typically parallel. Multiple pumps may be provided, located in the effluent end of the first RMF tank. The pumps may be sized to pump a combined 300% or more of the design flow, e.g., resulting in a minimum recycle ratio of 2:1 (2 volume units recycled, for every 1 volume unit forwarded on to the Nitrex™ filter). That said, the recycle ratio ($RR_1$ or $RR_2$) can be varied as needed. Actual recirculation or recycle ratio may be higher on days with relatively less flow, or lower on days with relatively higher flow, relative to the design flow rate (e.g., 16,000 gpd). In an embodiment, it may be advantageous to ensure that the recycle ratio does not go below 1:1, below 1.5:1, or below 2:1. By way of further example, the recycle ration may range from 3:1 to 5:1. Flow may be based on timer settings which control the pumps. As flow and/or strength of the wastewater increases, the operator could adjust the timer settings as needed to increase or decrease the recycle ratio (e.g., $RR_1$ or $RR_2$). Additional details of an exemplary system are provided in the Example section, below.

The pump stations can be operated on timer settings, which may be set to ensure that RMF bacteria stay alive and optimizes their treatment levels.

As shown in FIG. 1, an alkalinity feed system can be provided at 114. It can be important to ensure that the alkalinity of the wastewater entering the RMF is within a desired range to satisfy nitrification requirements. In areas with water supply from non-carbonate aquifers, it is not unusual for wastewater as generated to have an alkalinity concentration that is too low for nitrogen removal, such that alkalinity feed needs to be added to the wastewater, before entering the RMF unit. In an embodiment, such an alkalinity feed system may serve to increase the alkalinity levels to satisfy the nitrification requirement. Any of various alkalinity feed agents may be used for increasing alkalinity levels. In an example, alkalinity may be increased with limestone or a sodium carbonate (soda ash) solution. While stronger bases could be used (e.g., various alkali or alkaline earth hydroxides), a weak base solution such as the soda ash solution is sufficient to achieve the needed adjustment, while being safer than some of the stronger basic solutions that could alternatively be employed. Other relatively soluble carbonates or other weak bases may also be similarly suitable for use.

Where the system is installed in a cold weather climate, where freezing may regularly occur, it may be beneficial to provide the dosing tube of the alkalinity feed system 114 with a heat tracing adjacent the dose tube (e.g., wrapped around the dose tube, or simply running therewith), for heating the alkalinity adjustment solution, to ensure it does not freeze, and/or is maintained at a desired minimum temperature. For example, the solubility of soda ash (or another alkalinity feed agent) typically decreases with decreasing temperature, such that it may be desirable to maintain the alkalinity adjustment solution at a desired minimum temperature, even above its freezing temperature. For example, the alkalinity feed system solution may be maintained at a temperature of at least 50° F. In addition, the alkalinity feed system solution may be maintained at below the saturation point of the alkalinity feed adjusting agent dissolved therein. For example, saturated solutions may tend to precipitate solids, which can clog a small diameter tube used to dose the alkalinity feed system solution. In an embodiment, the alkalinity feed system solution may be maintained well below saturation, to minimize such risk of clogging. For example, the solution may be maintained at below 75%, below 50%, or below 40% of full saturation at a minimum contemplated operational temperature.

System and method 100 further include a Nitrex™ denitrification filter 120. The effluent from the final Nitrex™ filter stage (e.g., from a $2^{nd}$ stage, where a $2^{nd}$ stage is included) will be less than 2.5 mg/L in total nitrogen content, on a consistent basis. Such results are achieved at least in part because of the combination of the Nitrex™ filter, coupled with the AUF and RMF units, as shown. While a Nitrex™ filter such as that described in U.S. Pat. No. 5,318,699 (already incorporated by reference) may be capable of periodically achieving such a stringent standard on a given test day, under particular conditions, such previous systems are not necessarily capable of achieving such consistently, throughout the year, in summer and winter, day in and day out, without going above 2.5 mg/L. Assurance of such consistent reliability is what is required in order to have a permit for new construction approved. When used in the present systems as described herein, this stringent threshold can consistently be achieved, year round, in cold weather climates, even in systems that treat a relatively large volume of wastewater, e.g., significantly larger than a single family residence, or other small installation, such as in a hotel setting, that may be required to treat at least 5,000 at least 10,000, or at least 15,000 gpd.

As noted, the Nitrex™ denitrification filter may include an excavation (lined with an impermeable membrane) divided into a plurality of zones, each filled with an organic carbon material (e.g., wood-based, such as wood chips, or the like, as described in U.S. Pat. No. 5,318,699), potentially mixed with sand or a similar material. Such a denitrification module is very simple in construction and operation, at least in principle. The Nitrex™ module operates as an anoxic filter, under anaerobic conditions, converting the nitrogen in the wastewater (e.g., as nitrates or nitrites) to gaseous diatomic nitrogen ($N_2$), which is simply vented to the atmosphere as an inert, harmless product.

The Nitrex™ filter may also include internal piping, control valves, and inlet and outlet manifolds. The Nitrex™ module may be divided into a plurality of dosing sections (zones) or tanks, where the control system may select the next tank or section in sequence, after the previous section or tank has been dosed. Exemplary wastewater characteristics for the influent out of the RMF and into the Nitrex™ module may be as shown in Table 4, with the typical effluent out of the Nitrex™ filter, also shown in Table 4.

TABLE 4

| Influent (RMF Effluent) | | Nitrex ™ Effluent | |
| --- | --- | --- | --- |
| BOD | <30 mg/L | BOD | <30 mg/L |
| TSS | <30 mg/L | TSS | <30 mg/L |
| TN | <25 mg/L | TN | <2.5 mg/L |

It will be apparent that the Nitrex™ filter may thus not be performing any significant decrease in BOD or TSS, but is performing a significant decrease in TN. By way of example, while the TN loading within the Nitrex™ module influent may be <25 mg/L, it will typically be >10 mg/L, or greater than 15 mg/L, such as 10-24, or 10-20 mg/L of nitrogen, which must be further reduced to reach the stringent threshold of <2.5 mg/L achieved by the present systems.

Figure 2:
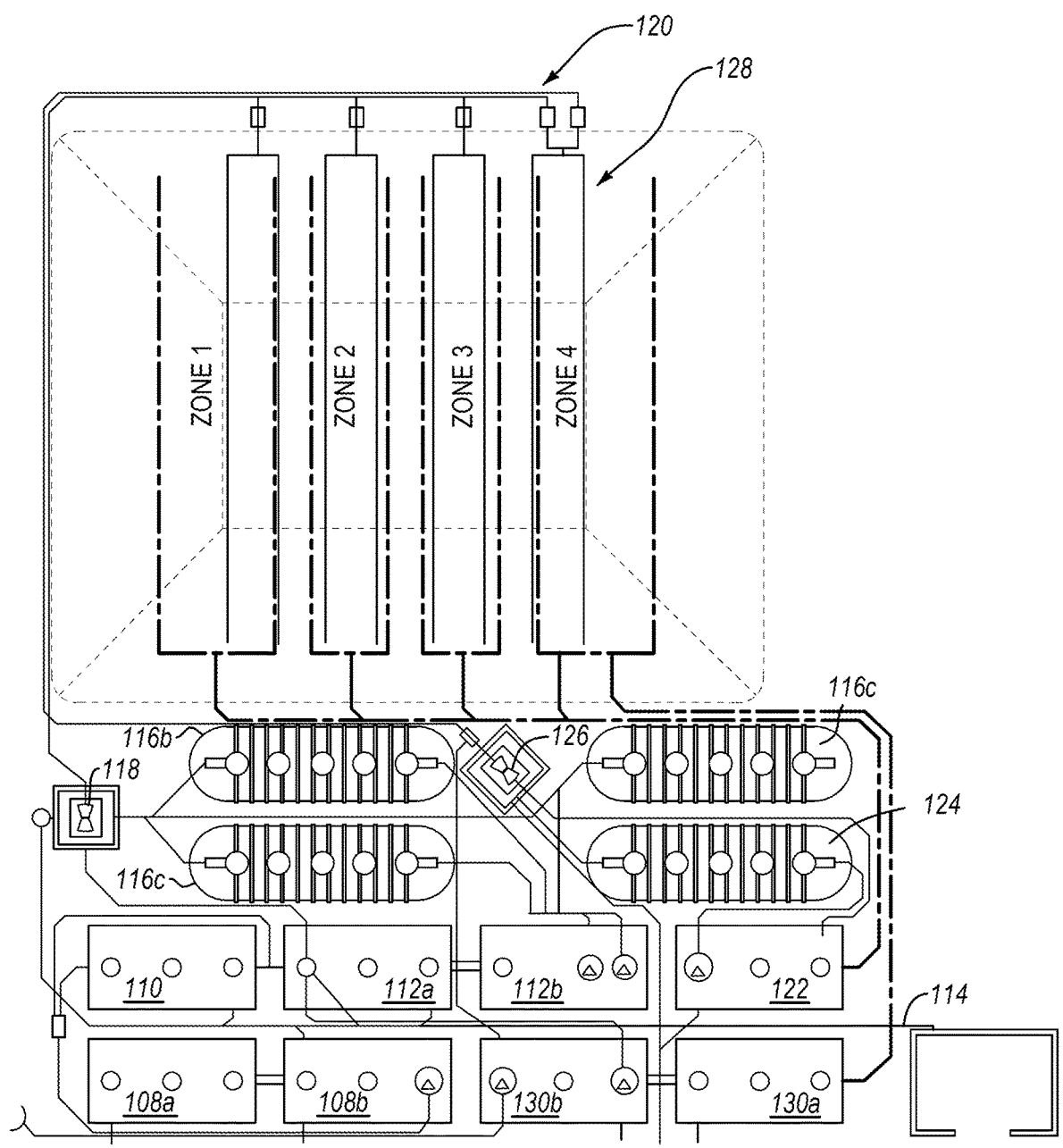
FIG. 2 is a schematic view showing various modules included within an exemplary wastewater treatment system, such as that of FIGS. 1 and 3.

By way of example, for a design flow of 16,000 gpd, the Nitrex™ module may have a denitrification filter volume of 75,000 to 150,000 gallons. In other words, the ratio of Nitrex™ volume to design flow may be from 5 to 10, from 5 to 8, or from 5 to 7 gallons/gpd. The Nitrex™ module may be divided into separate sections or zones, as described above. In an embodiment including $1^{st}$ and $2^{nd}$ stage Nitrex™ filters, the $1^{st}$ and $2^{nd}$ Nitrex™ filters may actually be provided by different sections of the same Nitrex™ filter structure, as described above (e.g., including a lined excavation, a wood-based media mixture divided between the plurality of sections, with inlet and outlet manifolds). The $1^{st}$ stage Nitrex™ filter may be made up of a one or more (e.g., a plurality) of the sections of the overall Nitrex™ module (e.g., sections 1-3), which sections are dosed in sequence during the method, and where the $2^{nd}$ Nitrex™ filter is provided as its own section of the plurality of sections (e.g., section 4). FIG. 2 illustrates such a possible configuration.

The effluent from the Nitrex™ filter will be "clean" water (e.g., having total nitrogen of <2.5 mg/L of nitrogen, <30 mg/L of BOD, and <30 mg/L of TSS), suitable for drain field or similar disposal or reuse.

As shown in FIG. 1, the effluent from the $2^{nd}$ stage Nitrex™ filter 128 may be sent to effluent recycling/drain field pump station 130. A portion of the effluent may be recycled ($RR_3$) back to the $1^{st}$ stage recirculation tank 112, while the remainder of the effluent is passed to the disposal system 132 (e.g., a drain field). In an embodiment, the recycle at $RR_3$ is optional, and determined by the Engineer/operator to optimize nitrogen removal. For example, where some recycle does occur at $RR_3$, the recycle ratio at $RR_3$ may range from 1:1 to 5:1.

In an embodiment, the disposal system 132 may be configured as a simple underground wastewater disposal system, e.g., by which the treated wastewater is discharged into trenches formed into the soil of the drain field. By way of example, the drain field may be sized based on the results of percolation testing of the soil in the drain field. For example, percolation may be from 10 to 30 minutes per inch (more typically 15-20 mpi) within a typical soil medium. Trench length, etc. may be determined based on the design flow rate of the wastewater being generated, as well as the percolation or other relevant characteristics of the soil making up the drain field.

Figure 3:
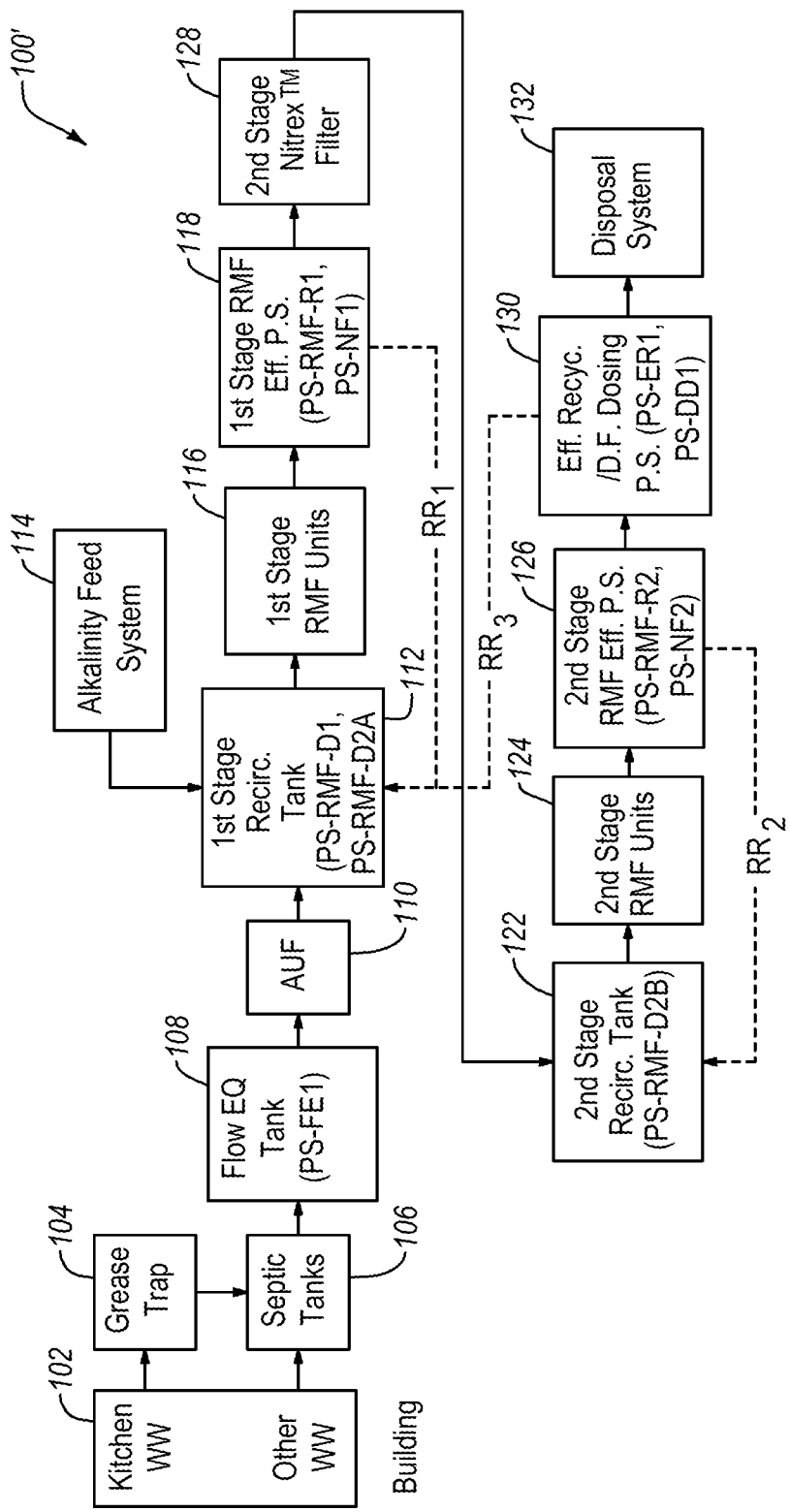
FIG. 3 is a flow diagram of another exemplary wastewater treatment system, e.g., the same system as FIG. 1, but operated under a "start-up" condition.

FIGS. 2-3 show a similar embodiment as described in FIG. 1, where FIG. 2 shows a schematic view, showing the various modules included in the system 100. FIG. 3 shows a system and method 100' similar to system and method 100 of FIG. 1, but in which only the $2^{nd}$ stage Nitrex™ filter is employed, for treatment of effluent received directly from the $1^{st}$ stage RMF units. A $2^{nd}$ stage is provided, but there is no further Nitrex™ filter included in the $2^{nd}$ stage, where the $2^{nd}$ stage simply includes the $2^{nd}$ stage recirculation tank 122, the $2^{nd}$ stage RMF unit(s) 124, the $2^{nd}$ stage RMF effluent pump station 126, the effluent recycle/drain field dosing pump station 130, and the disposal system (e.g., drain field) 132. Such a system and method as shown in FIG. 3 may operate on a subset of the same components of that of FIG. 1, and may be used, e.g., during a start-up phase when initially breaking the system in. Once the system has been acclimated for a desired start-up period (e.g., ±3 months), the system may be switched over to the configuration shown in FIG. 1, for "normal mode" operation.

IV. Example

Described below is a detailed example of how the present system may be implemented in a hotel, with 128 rooms, each generating 125 gpd (16,000 gpd total design flow). Actual flow may more typically only be about 75% of this design value (e.g., 12,000 gpd). It will be appreciated that some of the various modules may be omitted, that flow rates and specific configurations, sizing, etc. may be adjusted, depending on need.

1.1 Wastewater Management System Overview

The WMS includes a septic tank-effluent collection system with treatment by an Anaerobic Upflow Filter (AUF), and Recirculating Media Filter (RMF) integrated with a Nitrex™ Filter and discharged to a low-pressure drain field. The WMS includes the following components:

Collection System
    Building sewers
    Grease traps
    Septic tanks
Treatment System
    Flow Equalization (EQ) tank
    Anaerobic Upflow Filter (AUF)
    $1^{st}$ Stage recirculation tank
    $1^{st}$ Stage RMF treatment units
    Pump station for $1^{st}$ Stage Recirculation Return & Nitrex™ feed
    $1^{st}$ Stage Nitrex™ denitrification filters
    $2^{nd}$ Stage Recirculation Tank
    $2^{nd}$ Stage RMF treatment units
    Pump station for $2^{nd}$ Stage Recirculation Return & Nitrex™ feed
    $2^{nd}$ Stage Nitrex™ denitrification filters
    Drain field dosing pump station
    Drain field disposal system The system is illustrated in FIG. 1.

1.2 Design Basis/System Sizing

The design flow is based on:
128 Room Hotel
125 gpd/room
Total Design Wastewater Flow=16,000 gpd The hotel will not have a formal kitchen—continental breakfast service only. With minimal kitchen flow and laundry/showers discharging to the WMS, the wastewater is assumed to be typical residential strength with the following septic tank effluent (treatment system influent) quality:
    BOD—180 mg/L (more generally, e.g., 100-250 mg/L)
    TSS—100 mg/L (more generally, e.g., 60-140 mg/L)
    TN—65 mg/L (more generally, e.g., 40-80 mg/L)

The required effluent water quality is:
    BOD<30 mg/L
    TSS<30 mg/L
    TN<2.5 mg/L 1.2.1 Septic Tank The septic tank is sized based on the Code requirement of 1.5-times the Code daily flow. Other septic tank requirements are:
    1st compartment (or 1st tank, if tanks in series are to be used) generally needs to be ⅔ the total volume.
    Maximum number of tanks in series is 3.

With a design flow of 16,000-gpd, the minimum septic tank size is 24,000-gallons. A 16,000-gallon and 8,000 gallon tanks in series are proposed for this application. The final septic tank will drain by gravity to the flow equalization tank.

1.2.2 RMF Biofilter

The Waterloo RMF Biofilter has been selected for use preceding the Nitrex™ Filter, although other RMF technologies can be used. The total RMF treatment capacity will be split between the $1^{st}$ and $2^{nd}$ Stage RMFs. The first stage RMF will be capable of treating 100% of the design flow.

The 2nd Stage RMF, which is used for polishing and as a redundant treatment unit, will be sized to treat approximately 33% of the design flow. The Waterloo RMF Biofilter uses 3" polyurethane foam cubes as the media. Treatment units are sized based on volume of media, rather than surface area.

Two stages for the Waterloo RMF Biofilter units are proposed for this application. The units will be divided as follows:

1st Stage RMF Capacity=3 Units, 3,705-ft$^3$ media volume
2nd Stage RMF Capacity=1 Unit, 1,235-ft$^3$ media volume Table 5 presents a summary of the unit sizing:

TABLE 5

| RMF Media Volume | | |
|---|---|---|
| | All Units in Service | 1 Unit Offline |
| Minimum Media Volume (ft$^3$) | 2,990 | 2,990 |
| Total Media Volume Provided (ft$^3$) | 4,940 | 3,705 |
| Media Provided/Required | 165% | 124% |

Active air circulation will be achieved via circulation fans within each RMF tank via a circulation fan with a suction pipe that penetrates the full depth of the media (polyurethane foam cubes) within the tank. Passive ventilation will also be provided through the access openings, each of which is equipped with a large vent opening and an activated carbon filter.

1.2.3 Nitrex™ Denitrification Filters

The Nitrex™ denitrification filter for this project includes a lined excavation, zone dividers, a wood-based media mix, internal piping, control valves, and inlet and outlet manifolds. The zones will be dosed in sequence; with the system control panel selecting the next zone in the sequence following completion of the dose for the previous zone.

The inventor has extensive experience with sizing and dosing Nitrex™ filters for specific applications. The Nitrex™ denitrification filter will be designed based on the following influent and effluent water quality requirements as shown in Table 6.

TABLE 6

| Influent (RMF Effluent) | | Effluent | |
|---|---|---|---|
| BOD | <30 mg/L | BOD | <30 mg/L |
| TSS | <30 mg/L | TSS | <30 mg/L |
| TN | <25 mg/L | TN | <2.5 mg/L |
| TKN | <2 mg/L | | |

The inventor has determined that the following total Nitrex™ filter volume is required:

Design Flow—16,000 gpd
Req'd Nitrex™ Denitrification Filter Volume—77,000 gallons
Provided Nitrex™ Denitrification Filter Volume—100,000 gallons
Media provided as % of required—130%

1.2.4 Drain Field Disposal

The site was evaluated for disposal capacity. Based on soils testing results, the Large Underground Wastewater Disposal (LUWD) system was located in an area where percolation testing ranged from 15-17 minutes per inch (mpi), resulting in a hydraulic loading rate of 0.70 gpd/ft$^2$ for design of the primary treatment area. The reserve area had two percolation testing results that were both 30-mpi. The reserve area is sized using a loading rate of 0.60-gpd/ft$^2$.

Deep trenches are proposed for effluent disposal. The trenches will have an effective depth of 4.5-ft and be 2-ft wide. The linear loading rate of these trenches is 9-ft$^2$/LF. The minimum length of trench required for this application is 1,778-ft. The drain field trench system includes five zones, each containing 360-LF of trench for a total length of 1,800-ft.

1.2.5 Alkalinity Feed System

To ensure that the required nitrogen removal is not inhibited due to insufficient alkalinity, an alkalinity feed system is part of the WMS. Alkalinity will be supplied via an unsaturated soda ash solution that is batch mixed by the system operator on a monthly basis or otherwise as needed. The soda ash solution will be dosed to the 1$^{st}$ Stage Recirculation Tank (RT1-1) via a peristaltic dosing pump located inside the control/alkalinity feed room. Alkalinity in the raw water supply is understood to be 200 mg/L as $CaCO_3$.

1.3 Monitoring and Controls

The WMS will require approximately 10 duplex, alternating, septic tank effluent pump stations, flow and level measuring instrumentation and alkalinity feed equipment. All instrumentation, pump power and controls, chemical feed and other control functions will be provided by an internet based, single monitoring and control (M&C) system, furnished by the inventor. The M&C system will be set up with tiered access levels as follows:

Full Monitoring and Control—Inventor only

Read Only, Main Screen and Settings, includes access to viewing settings and historical data reports—Local System Operator and selected equipment suppliers Read Only, Main Screens Only—Owner, other inventor approved users Inventor provides O&M oversight as part of his professional services to the system owner. Inventor will remotely monitor the system and advise the local operator of any process changes/maintenance items that are needed. Inventor will coordinate O&M activities as needed with other equipment suppliers, particularly as they relate to the RMF unit. All pump stations will be controlled by the inventor's panel, including the Flow Equalization and Drain field Dosing pump stations.

2.1 Site and Project General Information

The wastewater collection system will include septic tanks and grease traps serving the hotel with the septic tank effluent pumped to the Nitrex™ Wastewater Treatment System followed by a low pressure drain field for effluent disposal. The proposed Nitrex™ Treatment System is an advanced wastewater nitrogen removal system with a design average effluent Total Nitrogen (TN) of <2.5 mg/l for residential type wastewater. The WMS includes recirculating media filters (RMF) and Nitrex™ denitrification filters to achieve TN<2.5 mg/L. The Nitrex™ filter is a denitrification filter whose organic media slowly degrades, providing labile carbon for denitrification. Typical air temperature (in ° F.) conditions in Bryce National Park (near where the hotel will be situated) are presented in Table 7.

TABLE 7

| | January | February | March | April | May | June | July | August | September | October | November | December |
|---|---|---|---|---|---|---|---|---|---|---|---|---|
| Avg. H | 37 | 38 | 45 | 54 | 64 | 75 | 80 | 77 | 70 | 58 | 45 | 36 |
| Avg. L | 15 | 17 | 23 | 29 | 37 | 45 | 53 | 50 | 42 | 32 | 23 | 15 |

2.2 Wastewater Management System Description

The WMS includes the following components:
Collection System
  Building sewers
  Grease traps
  Septic tanks
Treatment System
  Flow Equalization (EQ) tank
  Anaerobic Upflow Filter (AUF)
  $1^{st}$ Stage recirculation tank
  $1^{st}$ Stage RMF treatment units
  Pump station for $1^{st}$ Stage Recirculation Return & Nitrex™ feed
  $1^{st}$ Stage Nitrex™ denitrification filters
  $2^{nd}$ Stage Recirculation Tank
  $2^{nd}$ Stage RMF treatment units
  Pump station for $2^{nd}$ Stage Recirculation Return & Nitrex™ feed
  $2^{nd}$ Stage Nitrex™ denitrification filters
  Drain field dosing pump station
  Drain field disposal system The system will have the flexibility to operate in the following two (2) modes:
Start-up Mode (shown in FIG. 3)
Normal Mode (shown in FIG. 1)

Start-up Mode will be used during the initial stabilization period as the biological processes start-up and the Nitrex™ media degradation rate stabilizes. In Start-up Mode, the $2^{nd}$ Stage Nitrex™ filters will be utilized as part of the $1^{st}$ stage Nitrex™ units until all are stabilized. (i.e., all 4 zones may be dosed in sequence). The $2^{nd}$ Stage RMF effluent will be the final effluent of the system. Once the system has stabilized, it will be placed in Normal Mode with the $2^{nd}$ Stage Nitrex™ effluent being the final system effluent (and where the $1^{st}$ Stage Nitrex™ filter only doses zones 1-3, with zone 4 reserved for the $2^{nd}$ Stage Nitrex™ filter). While receiving 25% of design flow (4,000 gpd), start-up may take ±3 months. Partial effluent recycle is used to enhance nitrogen removal and to accelerate the start-up process. Process flow diagrams for Start-up and Normal Modes are presented as FIGS. 3 and 1, respectively.

In summary, the treatment process utilizes a 2-stage, fixed film nitrification/partial denitrification and passive denitrification system to achieve the required effluent quality. Building kitchen wastewater 102 flows to a grease trap 104 and then the septic tank 106. Other building wastewater (other than toilets) 102 flows directly to the septic tank 106. Septic tank effluent then flows to the Equalization Tank 108 with septic tank solids removed on a periodic as needed basis—e.g., when sludge levels exceed 33% of the liquid level. Peak flows are stored in the Equalization Tank 108. After passing through AUF 110, wastewater from the EQ Tank 108 is pumped to the $1^{st}$ Stage Recirculation Tank 112, where it is blended with the $1^{st}$ RMF effluent ($RR_1$). Partial denitrification occurs in the recirculation tank 112 as the $1^{st}$ Stage fixed film RMF nitrified effluent mixes with the anaerobic, high BOD wastewater from the EQ Tank 108. Effluent from the RMF 116 is split between recirculating back to the $1^{st}$ Stage Recirculation Tank 112 and forward flow to the $1^{st}$ Stage Nitrex™ denitrification filters 120. This process is repeated with the $2^{nd}$ stage RMFs 124 and Nitrex™ filters 128 prior to discharge to the drain field 132. Oxygen is provided to the system by a heated (when necessary) air handling system that provides fresh air and discharges air through an activated charcoal or soil or other odor removing filter. The buried treatment system is insulated and thereby maintains warm (non-freezing) temperatures.

3 Design Basis/System Sizing

All WMS components have been sized in accordance with applicable code.

3.1 Design Flow and Influent/Effluent Quality

The design flow is based on:
Hotel with 128 rooms
Code flow of 125 gpd/hotel room
Total Design Wastewater Flow=16,000-gpd The hotel will not have a formal kitchen—continental breakfast service only. With minimal kitchen flow and laundry/showers discharging to the WMS, the site's wastewater is expected to be typical residential strength with the following septic tank effluent (treatment system influent) water quality:
BOD—180 mg/L
TSS—100 mg/L
TN—65 mg/L The required effluent water quality is:
BOD<30 mg/L
TSS<30 mg/L
TN<2.5 mg/L which requires 96.2% removal of influent nitrogen.

3.2 Grease Trap

The grease trap will be provided as part of the building design. The proposed grease trap size is 1,000-gallons.

3.3 Septic Tank

The septic tank is sized based on the code requirement of 1.5-times the code daily flow, with a maximum of three (3) tanks in series. With a design flow of 16,000-gpd, the minimum septic tank size is 24,000-gallons. This will be achieved via 16,000-gallon and 8,000 gallon tanks in series.

The 3rd septic tank will drain by gravity to the Flow Equalization tank.

3.4 Flow Equalization Tank Sizing

The flow equalization tank is sized based on the following criteria:
Design Flow=16,000-gpd
Average Daily Flow=8,000-12,000 gpd
Hydraulic Retention Time=0.75-days
Minimum Flow EQ Working Volume=12,000-gallons
Dead Storage Volume=2,000-gallons
Minimum Flow EQ Tank Volume=14,000
Proposed Flow EQ Tank=16,000-gallons Flow equalization will be provided by storing flows in excess of the average daily flow during peak flow times and dosing stored flow during off-peak times. The flow equalization tank is also useful for storing wastewater should the treatment system need to be taken offline for a brief period to perform repairs. Equalized influent flow will be achieved via a pump station running off timer settings. The timer settings will be set based on the measured pump flow rate and historical average daily flows, with an initial setting of 10,000-gpd. A magnetic flow meter will be provided on the pump station force main between the Flow EQ tank and the 1$^{st}$ Stage Recirculation Tank.

Two (2) hydraulically connected 8,000-gallon, single compartment tanks will be used to provide the design tank volume. A duplex, effluent pump station is proposed for this application. No significant change from septic tank effluent water quality is expected in the flow equalization tank effluent. The proposed pumps are submersible centrifugal pumps with a bottom suction inlet. The floats will be set such that the operating water level will be a minimum of 1.0-ft above the bottom of the tank, resulting in a dead storage volume of 1,000-gallons in each tank (2,000-gallons total). This dead storage volume provides additional settling volume after the septic tank and helps guard against splashing/odor generation when coupled with a submerged inlet pipe.

3.4.1 Flow EQ Pump Station Pump and System Curve

The Flow EQ pump station includes two centrifugal pumps with discharge assemblies combining into a common discharge pipe. A float tree will be installed in the tank to control the pump station based on water level. The discharge assembly for each pump includes:

- 1.5-in. Schedule 40 PVC pipe, with an internal pipe diameter of 1.61-in.
- PVC ball Check valve
- PVC True Union ball valve
- (3) 1.5-in. 90° elbows
- (1) 1.5-in Tee (Receives flow from both pumps—flow is through branch for each pump)
- (1) 1.5"×2.0" Reducer The discharge assemblies for both pumps will combine via a 1.5-inch PVC tee with a common 1.5-inch outlet pipe. The effluent force main will be a 1.5-inch Schedule 80 PVC pipe, with an internal pipe diameter of 1.5-in.

The Flow Equalization pump will be a 0.50-h.p., three phase, 208-volt, submersible pump.

A system curve was developed for the septic tank effluent pump station based on the discharge assembly fittings listed above, the static head, pipe sizes, length of pipe and number/type of fittings associated with each pump station's individual force main. The range of operating conditions examined is bracketed by the high and low elevation change scenarios combined with high and low friction factors associated with new and old pipe. The length of force main, number and type of fittings and the velocity calculations for the septic tank effluent pump station are provided in the provisional applications, already incorporated by reference.

3.5 Anaerobic Upflow Filter (AUF)

The system will be equipped with an anaerobic upflow filter (AUF) to provide BOD removal prior to the Nitrex™ RMF units. The design BOD$_5$ (5-day testing period) removal rate, using a 6-hour HRT on the full design flow, is 50%. The design criteria for the AUF is as follows:

Design flow 16,000-gpd
Hydraulic Retention Time (HRT) 6-hours
Media porosity 60%
Minimum required AUF volume 6,700-gal
AUF volume provided 8,000-gal
Design BOD$_5$ removal 50%
Influent BOD$_5$ 180-mg/L
AUF effluent BOD$_5$ 90-mg/L 3.6 1$^{st}$ and 2$^{ND}$ Stage Recirculation Tank Sizing The treatment system will have the following two recirculation tanks:

1$^{st}$ Stage Recirculation Tank (RT-1)
2$^{nd}$ Stage Recirculation Tank (RT-2)

Each recirculation tank will have a duplex, effluent pump station for dosing the associated RMFs.

Tank RT-1 will blend 1$^{st}$ Stage Nitrex™ RMF treated wastewater with septic tank effluent from the Flow EQ tank. The purpose of this tank is to dilute the strength of the influent wastewater and to provide for partial denitrification. Denitrification regenerates some of the alkalinity consumed by nitrification. This tank will also provide storage volume above the normal operating water level for periods of higher flows. The design criteria for RT-1 are as follows:

RT-1 Design Criteria:
  Design Flow=16,000 gpd
  Min. Hydraulic Residence Time (HRT) @ minimum Operating Level=0.75 day
  HRT @ Maximum Operating Volume=1.0 day
  Minimum RT-1 Size=16,000 gallons
  Proposed RT-1 Volume=16,000 gallons Two 8,000-gallon tanks (RT1-1 & RT1-2) will be hydraulically connected to make up the total required recirculation volume.

RT-2 will receive the 1$^{st}$ Stage Nitrex™ Denitrification Filter effluent and blend it with the effluent of the polishing 2$^{nd}$ Stage Nitrex™ RMF units. The design criteria for RT-2 are as follows:

RT-2 Design Criteria:
  Design Flow=16,000 gpd
  Min. Hydraulic Residence Time (HRT) @ minimum Operating Level=0.25 day
  HRT @ Maximum Operating Volume=0.5 day
  Minimum RT-2 Size=8,000 gallons
  Proposed RT-2 Volume=8,000 gallons 3.7 Recirculating Media Filters (RMF)

The total RMF treatment capacity is split between the 1$^{st}$ and 2$^{nd}$ Stage RMFs. The first stage RMF is capable of treating 100% of the design flow. The 2$^{nd}$ Stage RMF, which is used for polishing and as a redundant treatment unit, is sized to treat approximately 33% of the design flow. The RMF Biofilter uses 3" polyurethane foam cubes as the media. Other media can be used.

The RMF module provides a design organic loading rate of 0.021-lb/day/ft$^3$. This loading rate is within the range of values reported for high rate attached growth trickling filters. The range reported is 10-25-lb/day/1,000 ft$^3$, which equals 0.01-0.025-lb/day/ft$^3$. This organic loading rate assumes adequate circulation and ventilation is maintained so that the air in contact with the thin film of wastewater coating the media is not depleted of oxygen. Circulation and ventilation are achieved via an internal circulation fan and passive ventilation openings.

Table 1 above presents the oxygen demand calculation and the resulting volume of media required to facilitate sufficient oxygen transfer to meet the demand. Table 2 shows details of the RMF biofilter units proposed for this application.

Active air circulation will be achieved via circulation fans within each RMF tank. Passive ventilation will be provided through the access openings, each of which is equipped with a large vent opening and a carbon filter The RMFs will be used for initial treatment (complete nitrification and partial denitrification) and for polishing when operated in Normal Mode. These units will be dosed by the following pump stations, located in the effluent ends of both recirculation tanks:

1st Stage RMF Dose Pump Stations (PS-RMF-D1A & PS-RMF-D1B)
    2nd Stage RMF Dose Pump Station (PS-RMF-D2)

The RMF biofilter reduces total nitrogen levels to below 25-mg/L when treating residential strength wastewater in cold climate applications.

Effluent from each unit will drain from the bottom of each unit to a pump station tank. Each tank will be a 6'×6' rectangular precast pump station tank with two (2) duplex pump stations. The $1^{st}$ Stage RMF Effluent Tank (RMF1-EFT) will have the following pump stations:

$1^{st}$ Stage RMF Recirculation Pump Station (PS-RMF-R1)
    $1^{st}$ Stage Nitrex™ Dose Pump Station (PS-ND1)

The $2^{nd}$ Stage RMF Effluent Tank (RMF2-EFT) will have the following pump stations:

$2^{nd}$ Stage RMF Recirculation Pump Station (PS-RMF-R1)
    Drain field Dose Pump Station (PS-DD1)

3.7.1 RMF Dose Pump Stations

To achieve the required RMF dosing on all three (3) $1^{st}$ stage units at the same time, two (2) pumps PS-RMF-D1A and PS-RMF-D1B are required and are located in the effluent end of the RT-1 tank. Both pump stations will operate according to timer settings and the following operating conditions:

Normal Operation—timer settings for the $1^{st}$ Stage RMF Dose Pump Stations will be initially set to pump a combined 300% of the design flow, resulting in a minimum recirculation ratio of 2:1.
    Adaptive Settings—the system operator/engineer will adjust timer settings in response to water quality and/or flow data. Adjustments can be performed locally or remotely.

The actual recirculation ratio will be higher for days with flow less than full design flow. The recirculation ratio, under normal operating conditions, will not go below 2:1 since the flow into the system is fixed by the PS-FE1 timer settings. As flow and/or strength of wastewater increases, the operator can adjust timer settings as needed to increase or decrease the recirculation ratio.

The RMF-1 Dose Pump Stations are duplex, alternating effluent pump stations. A common pump station discharge pipe carries flow from the two pumps through a 2.0-in Schedule 80 PVC force main.

The system curve for PS-RMF-D1 was developed using criteria as detailed in the provisional applications, already incorporated by reference.

The distal pressure is the pressure in the manifold that is necessary to push the design flow through the spray nozzles. It is included as part of the static head calculation. The design flow for each RMF dose pump station is 64-gpm @ 43.5' TDH, for a combined flow rate of 128-gpm. The force main velocity calculation results in a flow velocity of 6.33-ft/s.

Effluent from each RMF will drain from the bottom of the unit to a pump station tank to be either recycled to the RMF or dosed to the next unit process. The initial timer settings for both pump stations, complete with total flow and pump cycles per pump are included in the provisional applications, already incorporated by reference.

The design flow for the PS-RMF-D2 pump station is 69-gpm @ 38' TDH. The force main velocity calculation results in a flow velocity of 2.47-ft/s.

3.7.2 RMF Recycle Pump Stations

PS-RMF-R1 is located in the RMF-1 effluent tank (RMF1-EFT), and PS-RMF-R2 is located in the RMF-2 effluent tank (RMF2-EFT). Both pump stations will pump according to timer settings, which will be operator adjustable so that the recirculation ratio can be changed as needed.

The $1^{st}$ and $2^{nd}$ Stage RMF Recycle Pump Stations will be duplex, alternating effluent pump stations using Orenco PF301511 pumps. A common pump station discharge pipe will discharge flow from the two pumps through a 1.25-in Schedule 80 PVC discharge assembly, then through a 1.25-in Schedule 80 PVC force main. Hydraulically, both pump stations will have the same elevation change, the same discharge assemblies and only incidental differences in pipe length and fittings. For design purposes, the system curve will be the same for both pump stations. The system curve for the RMF Recirculation Pump Stations was developed based on criteria shown in the provisional applications.

The design flow for both pump stations is 38.0-gpm at 29' TDH. The force main velocity calculation results in a flow velocity of 6.6-ft/s.

Both pump stations are operated on timer settings, which are set to ensure that the recirculation flow is less than the dose flow by an amount equal to or greater than the total design flow. During start-up and periodically as part of O&M services, the flow rates and associated timer settings will be validated.

3.8 Alkalinity Feed System

The alkalinity feed system will be sized based on the following general criteria:

30-day demand at average daily flow of 12,000-gpd
    Unsaturated soda ash solution (5.5%)

Typical alkalinity in the local water supply is 200-mg/L as $CaCO_3$. Human contributions to wastewater alkalinity add approximately 90-mg/L to the source water, for an average septic tank effluent alkalinity of 290-mg/L. The alkalinity and soda ash demand calculations are included in the provisional applications already incorporated by reference. These calculations assume that the septic tank effluent has an average organic+ammonia (i.e. TKN) concentration of 65-mg/L, which will be completely nitrified and that 40-mg/L is denitrified in the recirculation tanks, resulting in an effluent nitrate concentration of about 25-mg/L. The resulting design soda ash demand is 83-mg/L.

A saturated soda ash solution is 11.0% soda ash at a temperature of 50° F., with solubility increasing at warmer temperatures. Saturated solutions tend to precipitate solids that have the potential to clog small diameter tubing used for dosing. The design will use an 4.0% solution (36% saturated as evaluated at 50° F.) to limit the potential for clogging of the dose tube, along with heat tracing to prevent a temperature drop that would reduce solubility.

Soda ash will be dosed from a mixing tank, equipped with a batch mixer, using a peristaltic pump. Bulk soda ash with a minimum purity of 99% will be mixed with water in the proper ratio to make the 5.5% unsaturated solution. The soda ash storage tanks will be designed to store up to 30 days of solution, assuming full design flow and the 83-mg/L dose concentration. A summary of the sizing calculations for the soda ash solution storage tank are included in the provisional applications already incorporated by reference.

The 30-day demand is 750-gallons of solution, for which a 800-gallon tank is proposed. As average wastewater flows are approximately 50% of design flows and peak flows do not typically occur for a duration of more than 2-3 days, the 14-day demand at full design flow is considered very conservative. The alkalinity feed pump, with a back-up spare pump, will operate on a timer. The timer settings will be adjustable as needed to meet flow and water quality based demand, which will be determined by periodic laboratory sampling of the $1^{st}$ stage RMF and final effluent. The provisional applications summarize the alkalinity feed flow rate calculation assuming a 5.5% solution and an initial dose of 83-mg/L.

3.9 Nitrex™ Denitrification Filter

The inventor's experience with the Nitrex™ denitrification filter is that effluent TN averages of <2.5 mg/l can be consistently achieved, particularly in combination with the other system modules.

The Nitrex™ denitrification filter for this project includes a lined excavation, a wood-based media mix, internal piping, control valves, inlet and outlet manifolds. The tanks will be dosed in sequence; with the system control panel selecting the next tank in sequence after the previous tank is dosed. The inventor has 15+ years of extensive experience with sizing and dosing the Nitrex™ filters for specific applications. The Nitrex™ denitrification filter will be designed based on the influent and effluent water quality requirements shown in Tables 4 and 6.

To achieve the needed nitrogen removal and effluent quality, for use with the RMF, the inventor has determined the following total Nitrex™ filter volume is required:

Design Flow—16,000 gpd
Req'd Nitrex™ Denitrification Filter Volume—77,000 gallons
Provided Nitrex™ Denitrification Filter Volume—100,000 gallons
Media provided as % of required—130%

The total proposed Nitrex™ filter volume is 100,000-gallons, which will be achieved using a lined excavation divided into four (4) zones. Three zones will be used as the 1st Stage Nitrex™ filters, and the fourth zone will be used as the $2^{nd}$ Stage Nitrex™ Filter. Table 8 presents the Nitrex™ filter zone sizing.

TABLE 8

| Zone Number | Total Volume (gallons) | Percent of Total Volume (%) |
|---|---|---|
| 1 | 25,499 | 25.5 |
| 2 | 24,504 | 24.5 |
| 3 | 24,504 | 24.5 |
| 4 | 25,499 | 25.5 |

The system will have the following two Nitrex™ Denitrification Filters feed pump stations:

$1^{st}$ Stage Nitrex™ Dose Pump Station (PS-NF1), located in the RMF1-EFT tank
$2^{nd}$ Stage Nitrex™ Dose Pump Station (PS-NF2), located in the leaching pool distribution tank (LPD-T1)

Both pump stations are duplex, alternating, lead/lag pump stations operating on-demand based on the RMF effluent pump station tanks water level. As this will be clean water, a simple paddle-wheel flow meter will be located on the effluent line of PS-NF1 and PS-NF2 to measure each dose.

PS-NF1 will dose the three (3) 1st stage Nitrex™ filters via a common manifold and solenoid valves in each tank. The control panel will sequence through each of the three (3) filters, dosing an operator adjustable volume to each Nitrex™ filter.

PS-NF2 will pump an operator adjustable dose to the $2^{nd}$ Stage Nitrex™ filter up to an operator set maximum daily volume. Both pump stations will only operate if sufficient water is available in their respective pump station tanks.

3.10 Nitrex™ Feed Pump Station Design

The system will have the following two Nitrex™ feed pump stations:

Normal Operation Mode: Nitrex™ Feed Pump Stations (PS-NF1, PS-NF2)
Single Pass Mode: (PS-NF2)

The PS-NF1 pump station will be housed in a filtered pump vault located in the RMF-1 Effluent Tank (RMF-EFT1). The PS-NF2 pump station will be housed in a filtered pump vault in the $2^{nd}$ Stage RMF Effluent Tank (RMF-EFT2). The pump stations will be duplex, alternating, lead/lag vertical turbine pumps stations operating on-demand based on the water level. Solenoid valves will control which tank is in service, and there will be a flow meter located on each effluent force main to measure each dose.

3.10.1 $1^{st}$ Stage Nitrex™ Feed Pump Station

When the water level in RMF1-EFT is above the recirculation operating level, the control panel will sequence through each Nitrex™ zone, dosing an operator adjustable volume to one Nitrex™ zone at a time. The system curve for the $1^{st}$ Stage Nitrex™ Feed Pump Station (PS-ND1) was developed using criteria shown in the provisional applications, already incorporated by reference The design flow for this pump station is 47.0-gpm at 62' TDH. The force main velocity calculation results in a flow velocity of 5.67-ft/s.

At 30-gpm, the PS-ND1 pump will be operating 794 minutes per day at design flows or 27.8% of the time. At average flows, pump would operate 13.9% of the time.

3.11 Effluent Recycle Pump Station

PS-ER1 is located in the Drain Field Dosing Tank (DD-1). When in operation, this pump station will pump according to operator adjustable timer settings, recycling a portion of the effluent flow back to the $1^{st}$ Stage Recirculation Tank (RT-1) in accordance with design recycle ratio objectives. When in service, the "ON" and "OFF" time cycles will be set by the operator to achieve the desired recycle flow.

PS-ER1 is a duplex, alternating effluent pump station using Orenco PF300511 pumps. A common pump station discharge pipe will discharge flow from the two pumps through a 1.25-in Schedule 80 PVC discharge assembly, then through a 1.0-in Schedule 80 PVC force main. The system curve for the Effluent Recycle Pump Station was developed using criteria shown in the provisional applications, already incorporated by reference.

The design flow for this pump station is 42-gpm at 17.5' TDH. The force main velocity calculation results in a flow velocity of 6.09-ft/s. The smaller pipe size and higher velocity is required to supply backpressure to the pump.

This pump is only operated at the discretion of the system operator. The maximum flow that would be recycled is 50% of the design flow during design flow conditions. At 23.5-gpm, the pump will be operating 497 minutes per day at design flows or 34.5% of the time. At average flows, pump would operate 17.2% of the time.

3.12 Pump Station Float Elevations

The two types of pump stations are On-Demand and Timer Operated. On-Demand pump stations will have 5 floats and timer operated pump stations will have between 2-4 floats. Float elevations and the resulting dose volumes for the On-Demand pump stations are presented in the provisional applications, already incorporated by reference.

Timer Operated pump stations perform recirculation and dosing functions provided that sufficient water level is present for dosing. The dose volume is determined by timer settings—not float elevations. Float elevations for the Timer Operated pump stations are presented in the provisional applications.

3.13 Large Underground Wastewater Disposal System (LUWD)

Based on soils testing results, the LUWD was located in an area where percolation testing ranged from 15-17 minutes per inch (mpi), and a hydraulic loading rate of 0.70 gpd/ft$^2$ was recommended for design of the primary treatment area. The reserve area had two percolation testing results that were both 30-mpi. The reserve area is sized using a loading rate of 0.60-gpd/ft$^2$.

The primary and reserve area sizing calculations are included in the provisional applications, leading to the total length of 4.5-ft effective depth deep trenches that have a linear loading rate of 9-gpd/ft$^2$.

The design flow for this pump station is 44-gpm @ 66' TDH. The force main velocity calculation results in a flow velocity of 4.49-ft/s.

3.14 Monitoring Requirements

Water quality monitoring will be required for the final effluent for permit compliance purposes. Influent water quality will also be collected to document treatment performance. Nitrate and ammonia will be monitored continuously on the 1$^{st}$ Stage RMF effluent to provide the system operator with advanced notice when adjustments to the treatment system are needed.

4.1 Remote System Access

The wastewater treatment and nitrogen removal system will have a remotely accessible central monitoring system integrated into the system control panel. This system will provide comprehensive information on the operational status and performance of the system and enable system adjustments, as needed. Notifications for alarm/alert conditions will be sent via email and/or text message to the System Operator and the Engineer.

The monitoring system will provide instantaneous information on:
1. Pumps and Controls Status
2. Nitrate and Ammonia real-time analyzer—with on-line monitoring of 1$^{st}$ or 2$^{nd}$ stage RMF effluent to assess nitrification performance
3. Flow
   a. Influent
   b. RMF Dose (1$^{st}$ and 2$^{nd}$ Stage)
   c. Nitrex™ Dose (1$^{st}$ and 2$^{nd}$ Stage)
   d. Effluent Recycle
   e. Final Effluent
4. Liquid Level
   a. Flow EQ Tank
   b. Alkalinity Feed Tank
   c. Carbon Feed Tank (for refilling/replacing activated carbon in the RMF vent openings)
5. Pump Current Sensors
6. Customized alarms
   a. Long run times
   b. Excessive flow
   c. High or low water levels in tanks with floats
   d. Pump failure (no current)
   e. Float errors (float stuck up or down)
   f. Inconsistency between pump run time and measured flow
   g. Operator and/or Engineer requested alarm conditions Alarms will be electronically transmitted to the local system operator and the Engineer, who will be continuously on-call.

5.1 Ventilation and Odor Control

Passive ventilation will be provided for all precast concrete treatment tanks via interconnected vent piping with a common inlet/outlet point. Tanks connected by gravity drains will share a common vent pipe, and the grease trap will be vented through the building sewer vent. The RMF units have internal recirculation fans and will passively vent through carbon filter covered openings in each access riser. Vent piping will be 4-inch PVC pipe and will be pitched to drain back toward the tanks to prevent any moisture accumulation.

The passive inlet/outlets will be equipped with carbon filters to guard against sulfide and organic odors. Each carbon filter will include:
- 24" diameter column
- 2-ft media depth
- 4" Inlet and outlet fitting
- Activated carbon media There will be a total of 2 passive carbon filters in the system. The vent piping layout is as shown in FIG. 2.

The selected carbon media is the Darco H$_2$S specialty activated carbon, which is designed to optimize removal of hydrogen sulfide and other sewage odors from the air stream. The Darco H$_2$S carbon has a higher adsorption capacity and is lighter than standard granulated activated carbon.

5.2 System Redundancy

All pump stations within the system are proposed to be duplex, alternating pump stations capable of delivering the full design flow with one of the pumps out of service. Each pump station will be equipped with current sensors to detect when pumps amperage differs significantly from design, which can be an indicator of when a pump is damaged or failing. Should one pump in a pump station fail, an alarm will alert the system operator and the failed pump will be taken out of service. The pump station will continue to operate as a simplex station until the failed pump is repaired or replaced. No interruption in treatment will occur due to the failure of one pump in a pump station. A minimum of one spare for each pump type will be stored on-site to enable rapid replacement of any failed pump.

5.3 Backup Power

In addition to full redundancy for all pumps, backup power will be provided by an emergency generator provided via the hotel. The main control panel, which powers all pumps, instrumentation and other powered equipment, will provide power to the system control panel and the panel powering all pumps and instrumentation within the collection and treatment system. The emergency generator will have a belly tank with sufficient capacity to power the facility at full design flow for a minimum of 3 days without requiring refueling.

An automatic transfer switch will automatically switch over to the emergency generator power in the event of a power outage. The system control panel will be capable of detecting when the system has shut down due to a power outage. A generator power start-up routine will be programmed into the system control panel that will sequence the pumps to be restarted. Preventing simultaneous starts for operating pump stations minimizes the start-up load exerted on the generator and reduces the required size of the generator.

5.4 Noise Attenuation

The operating pumps are all submersible pumps that are located below grade and underwater and therefore noise will not be discernible. Besides the emergency generator, there is no equipment operating outside of the building and above grade.

The system requires minimal operator attention. Operator maintenance will include two (2) site visits per month for the 16,000-gpd system. Operator maintenance activities include:

Cleaning of pump station filters—monthly or as needed

Checking of sludge and scum depths in the septic tanks, grease traps and Flow EQ tank on a monthly basis Solenoid valve cleaning/maintenance—annually or as needed RMF biofilter nozzle inspection and cleaning as needed—twice per month Nitrate & Ammonia Analyzer:
    Calibration—monthly
    Probe replacement—biannually Permit required water quality sampling—as required by UDEQ The local operations team will include:
Lead Operator
Assistant Operator
24-hour response time via answering service Final staffing and visitation will be dependent on UDEQ permit requirements for sampling and site visitation.

Features from any of the disclosed embodiments or claims may be used in combination with one another, without limitation. It will be appreciated that the scope of the present disclosure extends to rewriting any of the claims to depend from any other claim, to include multiple dependencies from any combination of other claims, and/or to combine multiple claims together. Such also extends to any individual or combinations of features of any of the embodiments as described in the Summary section, as well as the Detailed Description section. The scope of the present disclosure extends to inserting and/or removing any feature or combination of features from any claim or described embodiment, for insertion into another claim or embodiment, or drafting of a new claim including any combination of such features from any other claim(s) or embodiments.

It will also be appreciated that the present claimed invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

The invention claimed is:

1. A water treatment system for consistently achieving less than 2.5 mg/L of total nitrogen from a total wastewater starting influent having at least about 30 mg/L of total nitrogen, the system comprising:
    a septic tank;
    an anaerobic upflow filter (AUF) receiving wastewater from the septic tank;
    a recirculating media filter (RMF) receiving wastewater from the AUF;
    a denitrification filter receiving wastewater from the RMF and comprising a lined excavation, a wood-based media mixture, inlet and outlet manifolds, and wherein the denitrification filter is divided into a plurality of dosing sections that are dosed in sequence;
    a heated alkalinity feed system positioned for feeding an alkalinity adjustment solution for increasing alkalinity into the wastewater before entrance of the wastewater into the RMF; and
a drain field disposal downstream from the denitrification filter.

2. The system of claim 1, wherein the starting influent has at least 50 mg/L of total nitrogen.

3. The system of claim 1, wherein the starting influent has from 30 to about 100 mg/L of total nitrogen.

4. The system of claim 1, wherein the system is configured to remove 95-99% of influent nitrogen.

5. The system of claim 1, wherein the system consistently achieves <2.5 mg/L of total nitrogen during each month of the year, year-round, in a cold weather climate.

6. The system of claim 1, wherein the influent includes at least one of:
    biological oxygen demand (BOD) of about 180 mg/L;
    total suspended solids (TSS) of about 100 mg/L; or
    total nitrogen (TN) of about 65 mg/L;
    and the system is configured to provide a system effluent of:
    a BOD of less than 30 mg/L;
    a TSS of less than 30 mg/L; and
    a TN of less than 2.5 mg/L.

7. The system of claim 6, wherein the influent includes each of:
    biological oxygen demand (BOD) of about 180 mg/L;
    total suspended solids (TSS) of about 100 mg/L; and
    total nitrogen (TN) of about 65 mg/L.

8. The system of claim 6, wherein the influent includes biological oxygen demand (BOD) of from 100 to 250 mg/L.

9. The system of claim 6, wherein the influent includes total suspended solids (TSS) of from 60 to 140 mg/L.

10. The system of claim 6, wherein the influent includes total nitrogen (TN) of from 40 to 80 mg/L.

11. The system of claim 1, wherein the heated alkalinity feed system delivers an unsaturated soda ash (sodium carbonate) solution.

12. The system of claim 1, wherein the heated alkalinity feed system comprises a dose tube for delivering the alkalinity adjustment solution, and a heat tracing adjacent the dose tube for heating the alkalinity adjustment solution in a cold weather climate.

13. The system of claim 1, wherein the heated alkalinity feed system is configured to increase alkalinity of the wastewater to a value from about 400 mg/L to about 600 mg/L as $CaCO_3$.

14. A water treatment system for consistently achieving less than 2.5 mg/L of total nitrogen from a gray water starting influent having at least about 40 mg/L of total nitrogen, the system comprising:
    a septic tank;
    a flow equalization tank receiving wastewater from the septic tank;
    an anaerobic upflow filter (AUF) receiving wastewater from the flow equalization tank;
    a recirculation tank receiving wastewater from the anaerobic upflow filter;
    a recirculating media filter (RMF) receiving wastewater from the recirculation tank;
    an RMF effluent pump station for recycling a portion of effluent from the RMF to the recirculation tank, at a selected recycle ratio;
    a denitrification filter fed by the portion of effluent from the RMF that is not recycled to the recirculation tank and comprising a lined excavation, a wood-based media mixture, inlet and outlet manifolds, and wherein the denitrification filter is divided into a plurality of dosing sections that are dosed in sequence;

a heated alkalinity feed system positioned for feeding an alkalinity adjustment solution for increasing alkalinity into the wastewater before entrance of the wastewater into the RMF;

a $2^{nd}$ recirculation tank receiving wastewater from the denitrification filter;

a $2^{nd}$ RMF receiving wastewater from the $2^{nd}$ recirculation tank;

a $2^{nd}$ RMF effluent pump station for recycling a portion of effluent from the $2^{nd}$ RMF to the $2^{nd}$ recirculation tank;

an effluent recycle and drain field pump station receiving wastewater from the $2^{nd}$ RMF; and a drain field disposal system receiving wastewater from the effluent recycle and drain field pump station.

15. The system of claim 14, wherein the recycle ratio is at least 2:1.

16. The system of claim 14, wherein the system is configured to remove 95-99% of influent nitrogen.

17. The system of claim 14, wherein the influent includes each of:
    biological oxygen demand (BOD) of about 180 mg/L;
    total suspended solids (TSS) of about 100 mg/L; and
    total nitrogen (TN) of about 65 mg/L;
    and the system is configured to provide a system effluent of:
    a BOD of less than 30 mg/L;
    a TSS of less than 30 mg/L; and
    a TN of less than 2.5 mg/L.

18. A water treatment system for consistently achieving less than 2.5 mg/L of total nitrogen from a total wastewater starting influent having about 40 to about 80 mg/L of total nitrogen, the system comprising:
    a septic tank;
    a flow equalization tank receiving wastewater from the septic tank;
    an anaerobic upflow filter (AUF) receiving wastewater from the flow equalization tank;
    a $1^{st}$ stage recirculation tank receiving wastewater from the anaerobic upflow filter;
    a $1^{st}$ stage recirculating media filter (RMF) receiving wastewater from the 1 stage recirculation tank;
    a $1^{st}$ stage RMF effluent pump station for recycling a portion of effluent from the $1^{st}$ stage RMF to the $1^{st}$ stage recirculation tank, at a selected recycle ratio;
    a $1^{st}$ stage denitrification filter fed by the portion of effluent from the $1^{st}$ stage RMF that is not recycled to the $1^{st}$ stage recirculation tank and comprising a lined excavation, a wood-based media mixture, inlet and outlet manifolds, and wherein the $1^{st}$ stage denitrification filter is divided into a plurality of dosing sections that are dosed in sequence;
    a heated alkalinity feed system positioned for feeding an alkalinity adjustment solution for increasing alkalinity into the wastewater before entrance of the wastewater into the $1^{st}$ stage RMF;
    a $2^{nd}$ stage recirculation tank receiving wastewater from the $1^{st}$ stage denitrification filter;
    a $2^{nd}$ stage RMF receiving wastewater from the $2^{nd}$ stage recirculation tank;
    a $2^{nd}$ stage RMF effluent pump station for recycling a portion of effluent from the $2^{nd}$ stage RMF to the $2^{nd}$ stage recirculation tank;
    a $2^{nd}$ stage denitrification filter fed by the portion of effluent from the $2^{nd}$ stage RMF that is not recycled to the $2^{nd}$ stage recirculation tank;
    an effluent recycle and drain field pump station receiving wastewater from the $2^{nd}$ stage denitrification filter; and
    a drain field disposal fed by the effluent recycle and drain field pump station;
    wherein the system consistently achieves <2.5 mg/L of total nitrogen during each month of the year, year-round, in a cold weather climate.

19. The system of claim 18, wherein the $1^{st}$ and $2^{nd}$ stage denitrification filters are configured as different sections of the same denitrification filter, where the $1^{st}$ stage denitrification filter comprises a plurality of the plurality of sections, which are dosed in sequence, and the $2^{nd}$ stage denitrification filter comprises its own section of the plurality of sections.

* * * * *